United States Patent [19]
Stanley et al.

[11] Patent Number: 5,689,710
[45] Date of Patent: Nov. 18, 1997

[54] PROTECTED MODE C BINDING FOR PCMCIA CARD SERVICES INTERFACE

[75] Inventors: James C. Stanley, Portland; David A. Sandage, Forest Grove; Stewart W. Hunt, Portland; Arland D. Kunz, Beaverton, all of Oreg.

[73] Assignee: Intel Corporation, Santa Clara, Calif.

[21] Appl. No.: 500,529

[22] Filed: Jul. 11, 1995

Related U.S. Application Data

[63] Continuation of Ser. No. 40,214, Apr. 1, 1993, abandoned.

[51] Int. Cl.$^6$ .................. G06F 9/30; G06F 9/00
[52] U.S. Cl. .............. 395/701; 395/670; 364/228.1; 364/231; 364/234; 364/236.2; 364/DIG. 1
[58] Field of Search .................. 395/700, 650; 364/DIG. 1, DIG. 2

[56] References Cited

U.S. PATENT DOCUMENTS

| | | | |
|---|---|---|---|
| 5,204,947 | 4/1993 | Bernstein et al. | 395/157 |
| 5,274,819 | 12/1993 | Bloomfield-Brown | 395/700 |
| 5,302,947 | 4/1994 | Fuller et al. | 340/825.34 |

OTHER PUBLICATIONS

Daniel A. Norton, *Windows device drivers*, Journal: C Users Journal Dec. 1992, Copyright R&D Pulbications Inc. (1992).

Mark Nelson, *Bimodal interrupt handling under 80286 DOS extenders*, (includes a related article describing DOS extenders), Journal: C Users Journal Dec. 1992, Copyright R&D Publications (1992).

Andrew Schulman, *Call VxD functions and VMW services easily using our generic VxD.*, Journal Microsoft Systems Journal Feb. 1993, Copyright M&t Publishing Inc. (1993).

Thomas W. Olsen, *Making Windows and DOS programs talk (Tutorial)*, Journal: Windows–DOS Developrer's Journal May 1992, Copyright R&D Pulbications Inc. (1992).

Publication of the Personal Computer Memory Card International Association (PCMCIA) entitled: Card Services – Release 1.11; Sunnyvale, California, Aug. 16, 1992.

Publication of the Personal Computer Memory Card International Association (PCMCIA) entitled: PC–Compatible Socket Services Binding, Draft 2.00c; Sunnyvale, California, Sep. 12, 1992.

Publication of the Personal Computer Memory Card International Association (PCMCIA) entitled: PCMCIA Socket Services Interface Specification. Draft 2.00c; Sunnyvale, California, Sep. 12, 1992.

*Primary Examiner*—Kevin A. Kriess
*Assistant Examiner*—Majid Banankhah
*Attorney, Agent, or Firm*—Blakely, Sokoloff, Taylor & Zafman

[57] ABSTRACT

A library of C functions to perform PCMCIA Card Services. A PCMCIA Card Services specification defines a set of functions which allow applications and device drivers to access PCMCIA Cards. The PCMCIA Card Services specification provides a register based software interrupt binding to access the Card Services functions. A library of C functions is defined which can be called to perform the Card Services functions. The library of C functions can reformat the function parameters and then call a Card Services provider with a standard register based software interrupt binding. Alternatively, the library of C functions can be a fully protected mode implemenation of Card Services.

18 Claims, 5 Drawing Sheets

PROTECTED MODE C BINDING FOR PCMCIA CARD SERVICES INTERFACE

This is a continuation of application Ser. No. 08/040,214, filed Apr. 1, 1993 now abandoned.

BACKGROUND OF THE INVENTION

1. Field of the Invention

This invention relates to device driver interfaces. More specifically to a C language function library for accessing PCMCIA Card Services on a personal computer running the Microsoft® Windows operating system.

2. Art Background

Laptop and notebook sized personal computers have become very common. A problem with many existing laptop and notebook sized personal computers is that is difficult to add peripherals to such systems since there are no internal expansion slots. Peripherals can be connected to external ports on laptop and notebook sized personal computers, however, the external peripherals hang off the side of the portable computer system thereby making the system no longer portable.

To provide a convenient interface for small peripheral devices, a computer industry consortium drafted a specification defining a standard interface for credit-card sized peripherals. The computer industry consortium is known as the Personal Computer Memory Card Industry Association (PCMCIA) and the standard credit-card sized peripherals are known as PCMCIA Cards. The first version of the PCMCIA specification (PCMCIA 1.0) created an interface that could handle memory card expansion as well as some simple peripherals such as card-sized modems. The second version of the PCMCIA specification (PCMCIA 2.0) is a full bus specification capable of handling most common types of computer peripherals such as hard disk drives and LAN interfaces.

The PCMCIA standard is defined such that it is possible to plug in and remove cards while the base system is running, without damage to the cards or to the base system. This hot insertion/removal feature is unique to PCMCIA computer hardware. Furthermore, configuration information is kept in memory on a PCMCIA card itself, to allow the system to adapt to the card when it is plugged into a computer system. The PCMCIA standard defines the physical size and shape of PCMCIA cards. The PCMCIA standard also defines power and voltage levels, and connector pinouts. Cards which comply with the PCMCIA standard may be plugged into compatible systems without fear that the connectors won't match or that voltage differences will damage the hardware. The standard also defines the range of configuration information which may be kept on the cards, and indicates how software can read this information.

The PCMCIA hardware includes the socket into which the card is plugged, a connector for conveying power and information between the cards and the computer, and a socket adapter integrated circuit which couples the computer microprocessor to the sockets. The adapter contains hardware to generate microprocessor interrupts when a card hardware change event occurs, such as a cards being inserted or removed, or a card battery running low. Mapping hardware allows the card's memory, I/O, and interrupt to be directed to the proper places within the overall computer system. For example, if a card which contains memory, the memory may be made to appear at any point in the computer's address space below 16 megabytes. Similarly, if a card can generate an interrupt request, the interrupt request can be routed to one of a number of system IRQ lines.

The current PCMCIA standard defines two layers of software that a computer system uses to access and manage PCMCIA cards. The two layers of software are called the Socket Services layer and the Card Services layer. The Socket Services and Card Services layers are designed such that a single system may have several instances of Socket Services (each instance of Socket Services serving a corresponding PCMCIA adapter), but only a single instance of Card Services. Clients of the Card Services layer see only a number of PCMCIA sockets available but not a number of PCMCIA adapters each of which has one or more sockets. This abstraction, and the configuration management support, are the primary reasons for the Card Services software layer.

In operation, applications which wish use PCMCIA cards access the PCMCIA cards by using a library of functions provided by the Card Services software layer. Applications which use the Card Services functions are known as Card Services 'clients.' A Card Services client registers with Card Services initially, giving Card Services the address of a client callback routine. Card Services executes the callback routine when a PCMCIA card related event occurs. For example, when a hardware interrupt from a PCMCIA card socket occurs the client's callback routine performs processing associated with the event. Events include hardware events such as card insertion/removal or low battery and software events such as a client requesting exclusive use of a card. Upon card insertion, a registered client might use the callback routine to query the card to determine the card's type. If card was the correct type it would then proceed to configure the card. The card's onboard memory, I/O, and interrupt must be set up to fit the system into which the card has been plugged. Card Services functions enable clients to configure cards by programming the card hardware registers and the PCMCIA adapter.

In the real mode DOS environment of an IBM® compatible personal computer, the Socket Services software layer of the PCMCIA standard is implemented using a ROM, a device driver, or a Terminate and Stay Resident (TSR) program. Most implementations of the Socket Services layer only require about 3K of memory, a relatively small amount of memory.

The Card Services software layer is implemented in a real mode DOS environment using a device driver or a TSR program which is loaded after DOS has loaded. The Card Services functions are accessed by Card Services clients using the software interrupt mechanism of the Intel processor as defined in the PCMCIA Card Services specification. (See *PC Card Services Interface Specification*, Release 2.00, September 1992, Personal Computer Memory Card International Association). Specifically, to call a Card Services function an application must load the function parameters into certain registers and then execute a INT 1A instruction with the AH register set to the hexadecimal value AF. Card Services analyzes the contents of the registers to obtain the function parameters and then performs the Card Services function requested. After completing the function, Cards Services returns to the application using a return from interrupt instruction.

The Microsoft® Windows operating environment is largely replacing the older DOS only environment in personal computers. The Microsoft® Windows environment provides an attractive graphical user interface (GUI) which makes Windows application programs easier to use. The Microsoft® Windows environment runs Windows applications located in the extended area of memory above the 1 megabyte boundary using the protected mode of the Intel processor.

Currently, Windows application programs which require access to Card Services must use the existing real mode implementation of Card Services as device drivers or Terminate and Stay Resident (TSR) programs for DOS. To access the real mode implementation of Card Services, a Windows application must switch from protected mode to real mode and calls Card Services TSR to carry out the Card Services function. This method of accessing Card Services is not very attractive for a number of reasons.

One problem is that it is inefficient to switch from protected mode which used to run Windows applications into real mode every time a call to the Card Services TSR is made.

Another problem with real mode DOS drivers is that the parameters supplied to the device driver must be translated when the real mode device driver is called from a protected mode Windows application. When a Windows application calls a real mode device driver, it passes pointers to data in selector:offset format. The interface to a real mode device driver requires that pointers to data be presented in a segment:offset format. Furthermore, it is likely that the protected mode Windows application points to data at an address above 1 Megabyte boundary. Since real mode device driver use segment:offset pointers, real mode device drivers cannot see data at addresses above 1 Megabyte. Therefore to use a real mode device driver the parameter data must be moved below the 1 Megabyte boundary.

Finally, most Windows application programs are written in the high level languages C and C++. Therefore most programmers that write Windows applications are not familiar with using the register based real mode binding defined in Appendix D of the PCMCIA Card Services specification. In fact to use the 8086 real mode binding a programmer must write assembly language code. Therefore the creation of a library of C Card Services functions would greatly facilitate the programming of Windows applications that use Card Services functions.

SUMMARY OF THE INVENTION

It is therefore an object of the present invention to provide a simple interface to Card Services functions for Windows applications.

Another object of the present invention is to provide a library of C functions for Windows applications which perform the Card Services functions.

Another object of the present invention is to provide a library of C functions for Windows applications which perform the Card Services functions without switching from protected mode into real mode.

These and other objectives are accomplished by the Card Services dynamic link library of the present invention. The Card Services dynamic link library provides a set of C functions which handle every Card Services function defined in the PCMCIA Card Services specification.

BRIEF DESCRIPTION OF THE DRAWINGS

The objects, features and advantages of the present invention will be apparent to one skilled in the art, in view of the following detailed description in which.

NOTATION AND NOMENCLATURE

Figure 1:
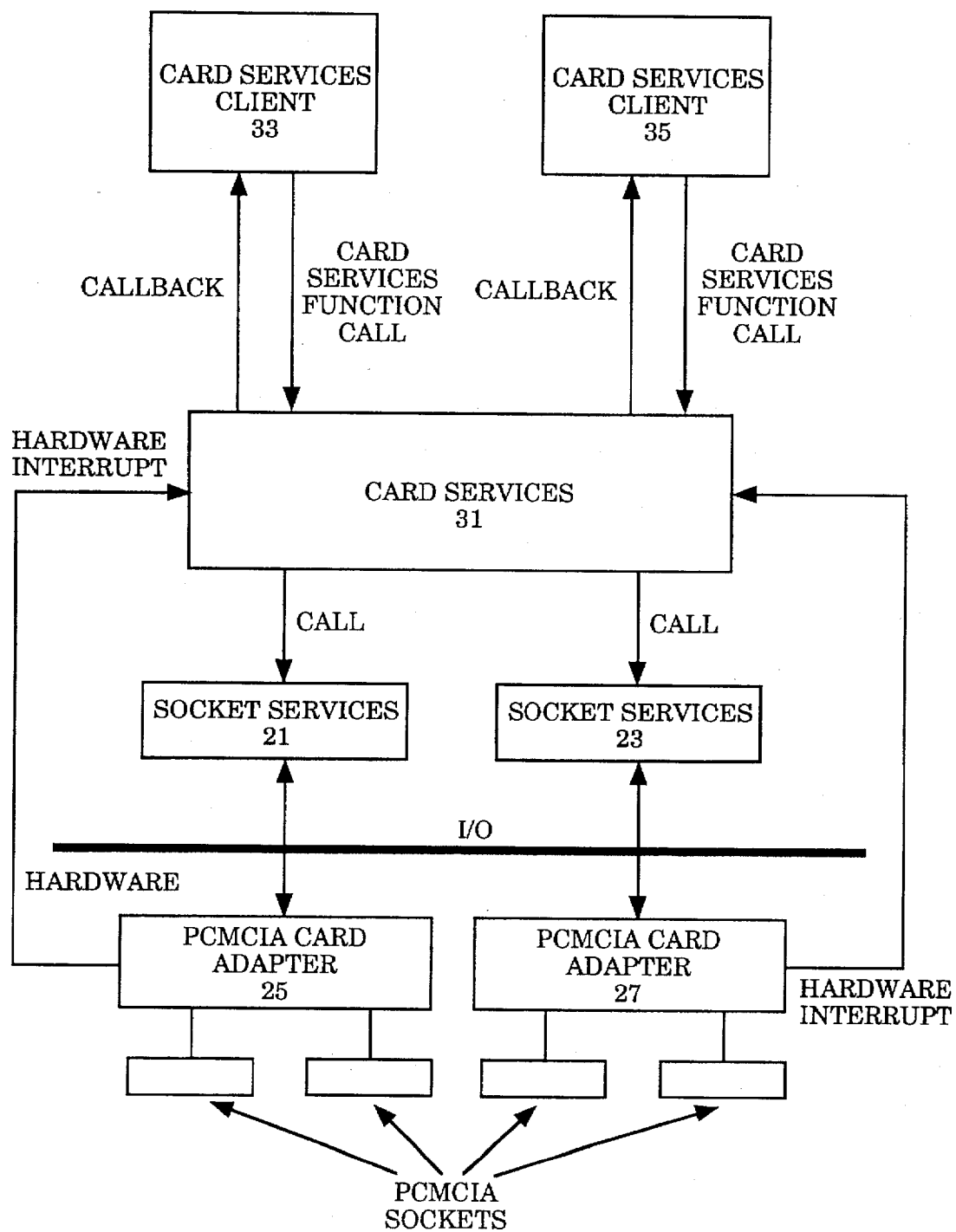
FIG. 1 is a block diagram of the Card Services and Socket Services software layers defined by the PCMCIA specification as used in a computer system.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, selected, chosen, modified, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantifies and are merely convenient labels applied to these quantifies.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by the Assignee, Intel Corporation, as well as other manufacturers of computer systems.

DETAILED DESCRIPTION OF THE INVENTION

A C language function library for accessing PCMCIA Card Services on a personal computer is disclosed. In the following description, for purposes of explanation, specific nomenclature is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily.

Card Services in Real Mode

The current PCMCIA standard defines two layers of software that a computer system uses to access and manage PCMCIA cards. The two layers of software are called the Socket Services layer and the Card Services layer. FIG. 1 illustrates how the Socket Services and Card Services software layers are related and access the PCMCIA cards.

An instance of the Socket Services layer is implemented for each particular PCMCIA socket adapter in the system. Each Socket Services instance provides a set of routines used configure and control the corresponding PCMCIA Socket. Referring to FIG. 1, there is a different implementation of Socket Services (21 and 23) for each particular PCMCIA socket adapter (25 and 27, respectively) in the system. The Socket Services layer is designed such that it can be implemented in ROM and can be part of the system BIOS. However, the Socket Services layer is independent of the operating system running on the computer system. The functions in the Socket Services software layers (21 and 23) are called by the Card Services layer 31. The PCMCIA Socket Services Interface Specification specifies that Socket Services functions are called using the software interrupt mechanism INIT 1A. (See *PCMCIA Socket Services Interface Specification*, Release 2.00, September 1992, Personal Computer Memory Card International Association)

The Card Services software layer is designed to run on top of one or more instances of Socket Services. Card Services provides a set of functions which Card Services clients use to access and configure PCMCIA cards. Referring to FIG. 1, the Card Services software layer 31 is located above each implementation of Socket Services and calls the routines from each Socket Services implementation to perform hardware specific functions. The Card Services software layer 31 is operating system dependent and usually is loaded during the startup of the operating system. In an 8086 microprocessor operating in real mode, the Card Services functions are called by Card Services clients (33 and 35) using the software interrupt mechanism of the 8086 microprocessor. (INT 1A with the AH register set to the hexadecimal value AF). The Card Services layer 31 is designed to hide the different PCMCIA socket adapters from Card Services clients (33 and 35), such that the Card Services clients (33 and 35) always have a consistent interface to PCMCIA Cards. (See *PC Card Services Interface Specification*, Release 2.00, September 1992, Personal Computer Memory Card International Association)

Figure 2:
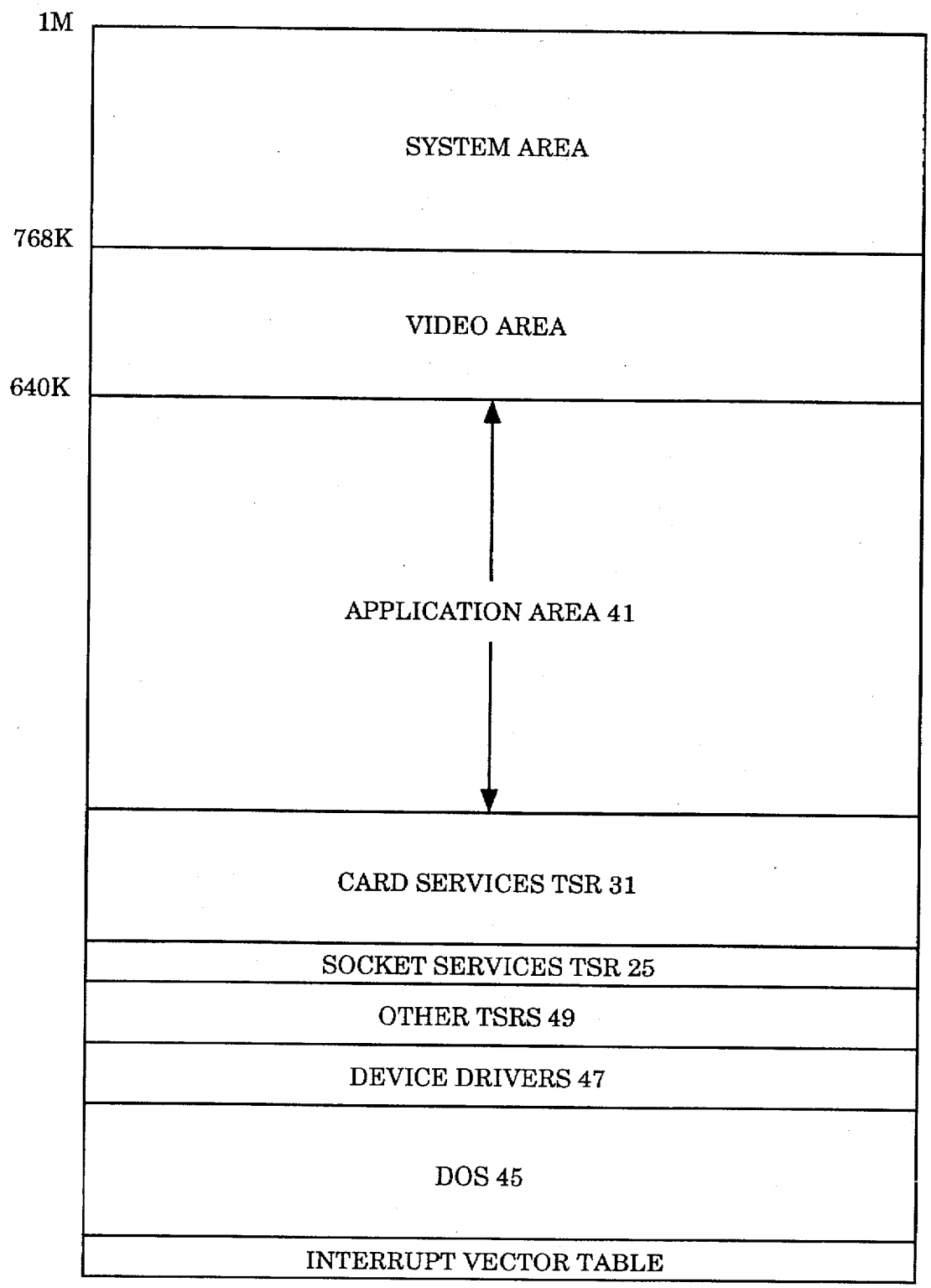
FIG. 2 is a typical memory map of a DOS machine after DOS, device drivers, and Terminate and Stay Resident (TSR) programs have been loaded.

FIG. 2 illustrates the memory map of a DOS computer system with a real mode implementation of the Card Services and Socket Services software layers. In the DOS machine illustrated in FIG. 2, the Socket Services and Card Services software layers are implemented as Terminate and Stay Resident (TSR) programs. The Socket Services TSR 25 and Card Services TSR 31 use valuable memory below the 640K barrier. The Socket Services TSR 25 only uses about 3K of memory, and therefore, it does not significantly reduce the amount of memory available to DOS applications in the application area 41. However, the 40K implementation of the Card Services TSR 31 significantly decreases the amount of real mode memory available to DOS application programs in the application area 41.

The Windows Environment

The Microsoft® Windows 3.1 system can operate in one of two modes: "standard" mode and "enhanced" mode. The standard mode exists so that personal computers equipped with older 80286 processors can use the Windows environment. The enhanced mode of Microsoft® Windows is used when Microsoft® Windows is run on a computer system which uses an 80386 or better microprocessor. Support for an older "real mode" of Windows has been dropped.

The present invention provides an C function library for performing PCMCIA Card Services functions for Windows applications running in the Microsoft® Windows environment. The two Card Services implementations disclosed are designed to operate only in the enhanced mode of Microsoft® Windows. In order to sufficiently disclose the C function library for Card Services of the present invention, the enhanced mode of the Microsoft® Windows operating system must first be explained.

The enhanced mode of Microsoft® Windows operates in the protected mode of the Intel 386 and 486 processors. In this manner, the enhanced mode of Microsoft® Windows takes advantage of features in the Intel 386 and 486 processors to offer virtual memory and multitasking operation. The processor hardware supports execution of several Windows applications in protected mode.

The enhanced mode of Microsoft® Windows supports DOS applications using "DOS virtual machines." In a DOS Virtual Machine, the 386 or 486 microprocessor operates in Virtual 8086 mode and uses the virtual memory feature to provide DOS, device drivers, and TSR programs originally loaded into the computer to a DOS virtual machine in extended memory. Windows uses the virtual memory system to make the application area and the DOS, device drivers, and TSR programs appear to be a single contiguous block of real mode memory. When the microprocessor is operating in Virtual 8086 mode within the address area of DOS virtual machine, the Virtual 8086 mode microprocessor cannot see any memory outside of the DOS virtual machine.

Figure 3:
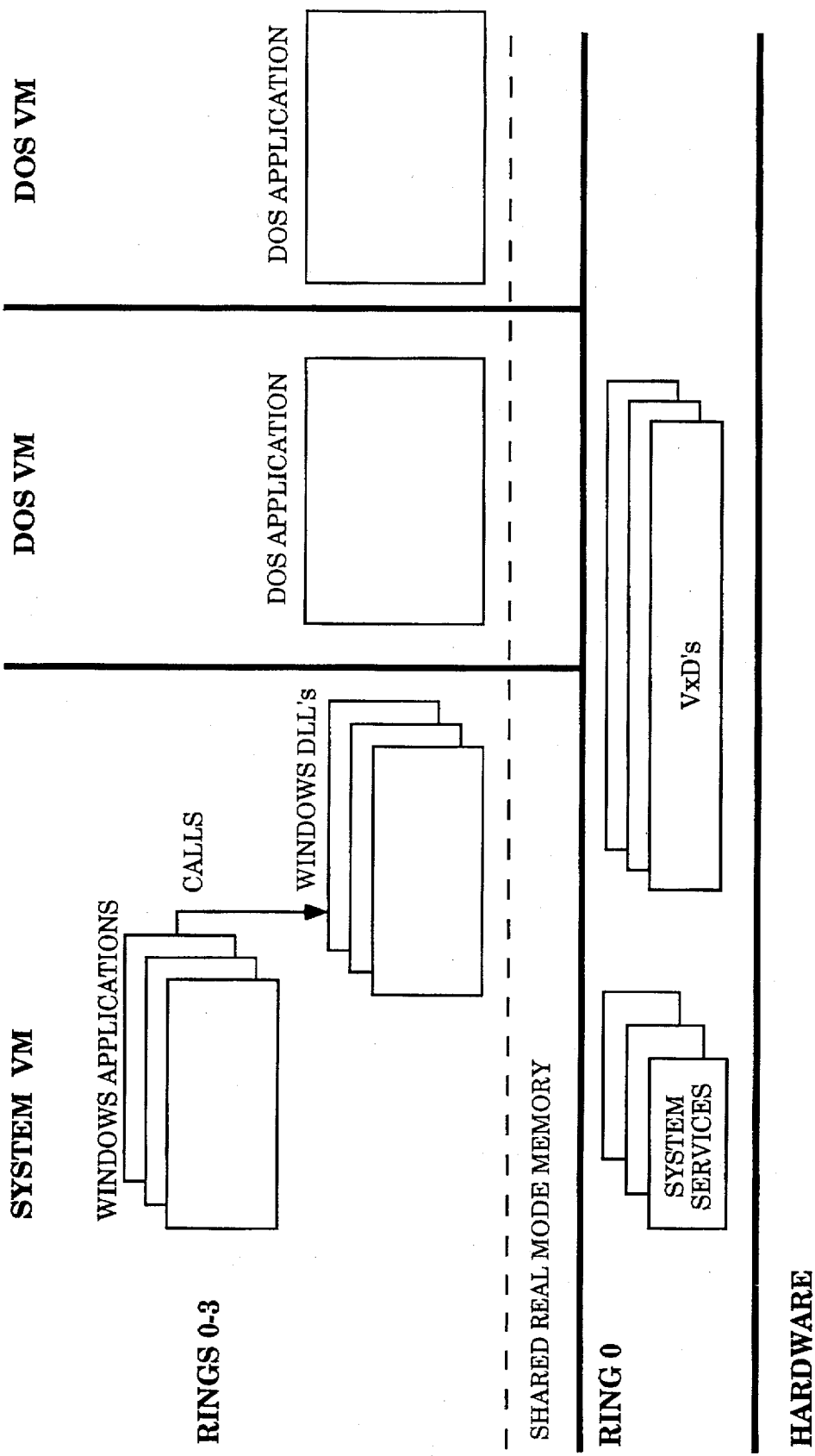
FIG. 3 is a conceptual diagram of the enhanced mode of Microsoft® Windows.

FIG. 3 provides a conceptual diagram of the Windows system in enhanced mode. At the bottom of the diagram is the computer system hardware. Just above the computer system hardware is the Ring 0 level with the Kernel and virtual device drivers (VxDs). At the top level is the system virtual machine and the various DOS virtual machines. Windows creates DOS virtual machines by mapping DOS, device drivers, and TSR programs in the system VM into the DOS VMs. Therefore, all the virtual machines share a region of memory called the shared real mode memory.

The Virtual device drivers (VxDs) at ring 0 are a special feature of Microsoft® Windows enhanced mode. A virtual device driver is actually a routine which manages a system resource such that more than one application can use the system resource at a time. Virtual device drivers therefore support Windows' ability to act as a multitasking operating system. Since virtual device drivers run at ring 0, virtual device drivers have access to a wide range of kernel services, including those for hardware management, memory management, task scheduling, and communicating with other virtual devices.

As illustrated in FIG. 3, all the Windows applications run within the system virtual machine which operates in protected mode. The Windows Dynamic Link Libraries (DLLs) which support Windows applications also run within the system virtual machine.

Each DOS application in FIG. 3 runs within its own DOS virtual machine. Since the DOS virtual machines usually operate in the Virtual 8086 mode of the microprocessor, the DOS applications generally can only address the 1 Megabyte of memory in the DOS virtual machine.

Card Services C Library Translation DLL

When the prior art real mode Card Services implementation of FIG. 2 is added to the Windows environment illustrated in FIG. 3, the Card Services Terminate and Stay Resident (TSR) program 31 is placed in the shared real mode memory area. In the enhanced mode of the Windows operating system, any program from any virtual machine would be able to directly access the Card Services TSR 31 located in the shared real mode memory area. However, if every program in every virtual machine directly accessed the single Card Services TSR 31, the Card Services TSR 31 would not operate properly and would eventually crash. The reason the Card Services TSR 31 would not operate properly is that the Card Services TSR 31 was originally designed and written only to operate in a simple DOS based computer.

Figure 4:
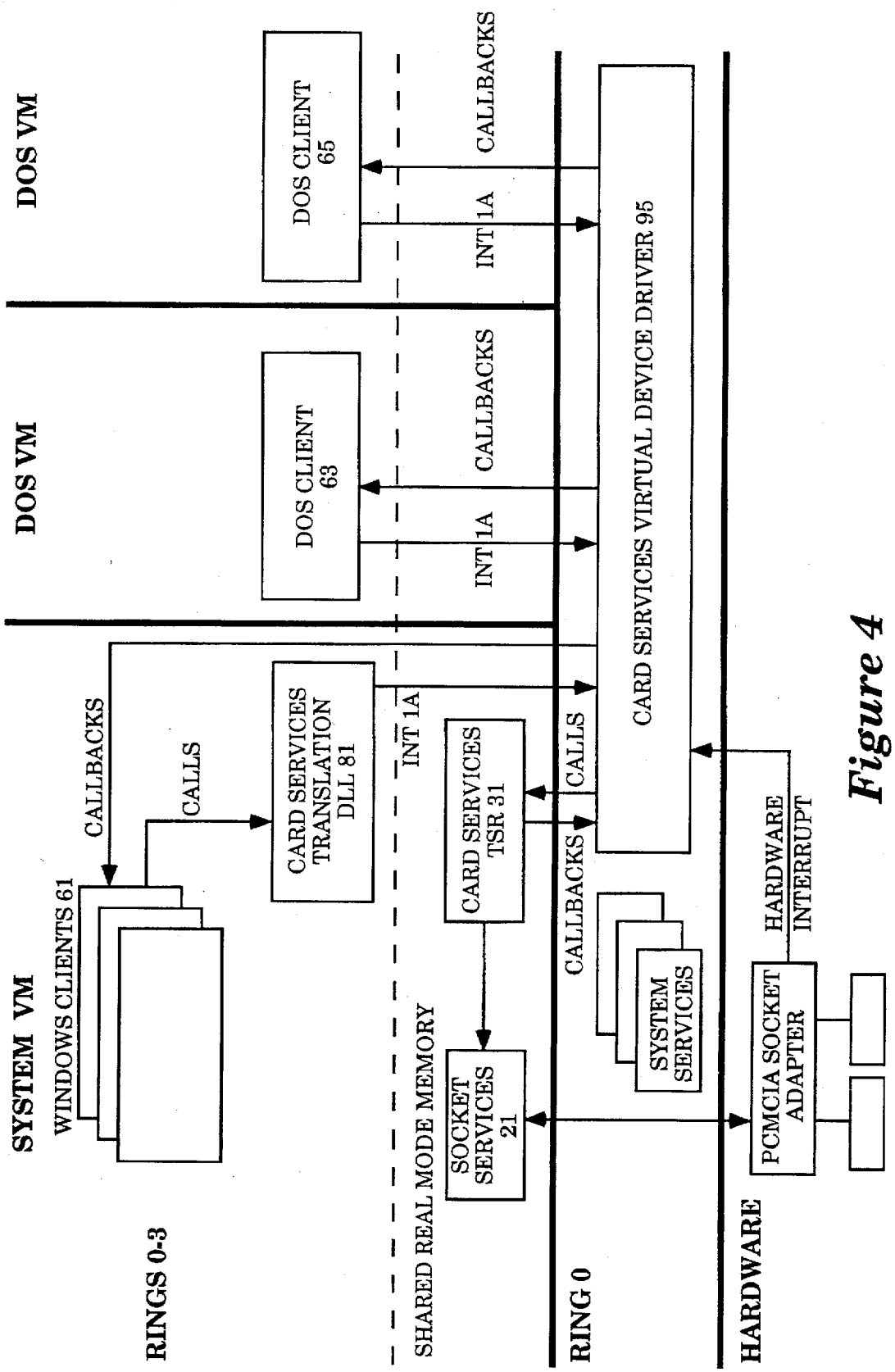
FIG. 4 is a block diagram of a protected mode Card Services translation dynamic link library which calls a read mode implementation of Card Services within a conceptual diagram of Microsoft® Windows in enhanced mode.

To properly manage the Card Services TSR 31, a Card Services virtual device driver is required. Card Services virtual device driver "virtualizes" the INT 1A software interrupt such that each time a Card Services client attempts to access the Card Services TSR 31, the Card Services virtual device driver gets control. The Card Services virtual device driver uses this control to carefully manage every access to the Card Services TSR 31 such that the Card Services TSR 31 will operate properly. FIG. 4 illustrates the enhanced mode Windows environment with a Card Services virtual device driver 95 to control access to the Card Services TSR 31 located in the shared real mode memory.

In order to provide a library of Card Services C functions for Windows applications, a software layer has been placed in the system virtual machine between the Windows applications and the Card Services virtual device driver 95. This software layer comprises a dynamic link library of C functions entitled the Card Services Translation Dynamic Link Library (DLL) 81. The Card Services Translation DLL 81 provides a full library of C functions such that any of the Windows applications which are Card Services clients 61 can access any Card Services function by calling the appropriate C function in the Card Services Translation DLL 81. The complete library of C functions is fully described in the later section entitled "Card Services C Function Library". The Card Services Translation DLL 81 operates by loading the microprocessor registers and the performing an INT 1A software interrupt as defined in the PCMCIA Card Services Specification. The INT 1A software interrupt invokes the Card Services virtual device driver 95 to handle the access to Card Services.

The Card Services virtual device driver 95 obtains control after an INT 1A software interrupt is generated by any program in any virtual machine. The Card Services virtual device driver 95 first examines the parameters supplied by the calling Card Services client. If the parameters are real mode parameters supplied by a Card Services client located in a DOS virtual machine, then the Card Services virtual device driver 95 calls the Card Services TSR 31 with the supplied parameters.

However, if the parameters supplied by the calling Card Services client are protected mode parameters supplied by the Card Services Translation DLL 81 on behalf of a Windows client 61 operating in the system virtual machine then translation must be performed before the Card Services TSR 31 is called. The Card Services virtual device driver 95 translates the protected mode parameters by first copying the parameter data into a buffer below the 1 megabyte boundary and then supplying a real mode segment:offset pointer to the parameter data in the new buffer. The translated Card Services function parameters are loaded into the appropriate registers as defined by the Card Services specification. The Card Services virtual device driver 95 then access the Card Services TSR 31.

The Card Services virtual device driver 95 also handles callbacks from the Card Services TSR 31 back into the Card Services clients. However, in order to perform the callbacks properly, the Card Services virtual device driver 95 must slightly alter the client registration system. To fully disclose the callback procedure performed by the Card Services virtual device driver 95, the altered Card Services client registration system must first be explained.

Before a program can use Card Services functions, the program must first register with Card Services to become a Card Services client. The client registration is performed by generating an INT 1A software interrupt after loading specified registers with the address of a callback routine within the client and a pointer to a buffer supplying some client information. Within the buffer supplying some client information is a field called ClientData. The ClientData field contains an 8 byte value that the client needs to receive whenever a callback into the client is performed.

When the Card Services virtual device driver 95 obtains control after a program has attempted a Card Services client registration, the Card Services virtual device driver 95 stores copies of the ClientData field and the address of the callback routine provided by the registering program. The Card Services virtual device driver 95 then replaces the ClientData field with a value which will uniquely identify the new Card Services client. The Card Services virtual device driver 95 also replaces the callback address provided by the registering program with the address of a callback handling routine within the Card Services virtual device driver 95. The Card Services virtual device driver 95 then calls the Card Services TSR 31 with the altered ClientData field and callback address to perform the client registration. By altering the registration data, the Card Services virtual device driver 95 causes the Card Services TSR 31 to call the callback handling routine within the Card Services virtual device driver 95 whenever the Card Services TSR 31 performs a callback. The ClientData field provided by the Card Services TSR 31 will provide a value which uniquely identifies the Card Services client to be called back. The callback handling routine within the Card Services virtual device driver 95 will then perform the callback into the proper Card Services client.

For example, when the Card Services TSR 31 performs a callback (such as a callback to indicate that a client registration has successfully completed), the Card Services TSR 31 will always call the callback handling routine within the Card Services virtual device driver 95. The callback handling routine within the Card Services virtual device driver 95 examines the ClientData field supplied by the Card Services TSR 31 in order to identify which Card Services client must be called back. After identifying the proper Card Services client, the callback handling routine replaces the ClientData field supplied by the Card Services TSR 31 with the original ClientData field which was supplied by the Card Services client during client registration. The callback handling routine within the Card Services virtual device driver 95 next requests the kernel to schedule the virtual machine of the Card Services client to be called back. When the virtual machine of the Card Services client to be called back is scheduled, the callback handling routine finally calls the callback routine of the client using the original callback address supplied by the client during client registration. The callback into the Card Services client is performed using nested execution.

Although the system illustrated in FIG. 4 provides a C function library interface into Card Services for Windows applications, the system does not address the problem of requiring a switch from protected mode into real mode. The system illustrated in FIG. 4 also uses valuable memory below the 640K memory barrier in every DOS VM regardless of whether the DOS application requires Card Services.

Full Protected Mode Card Services DLL

Figure 5:
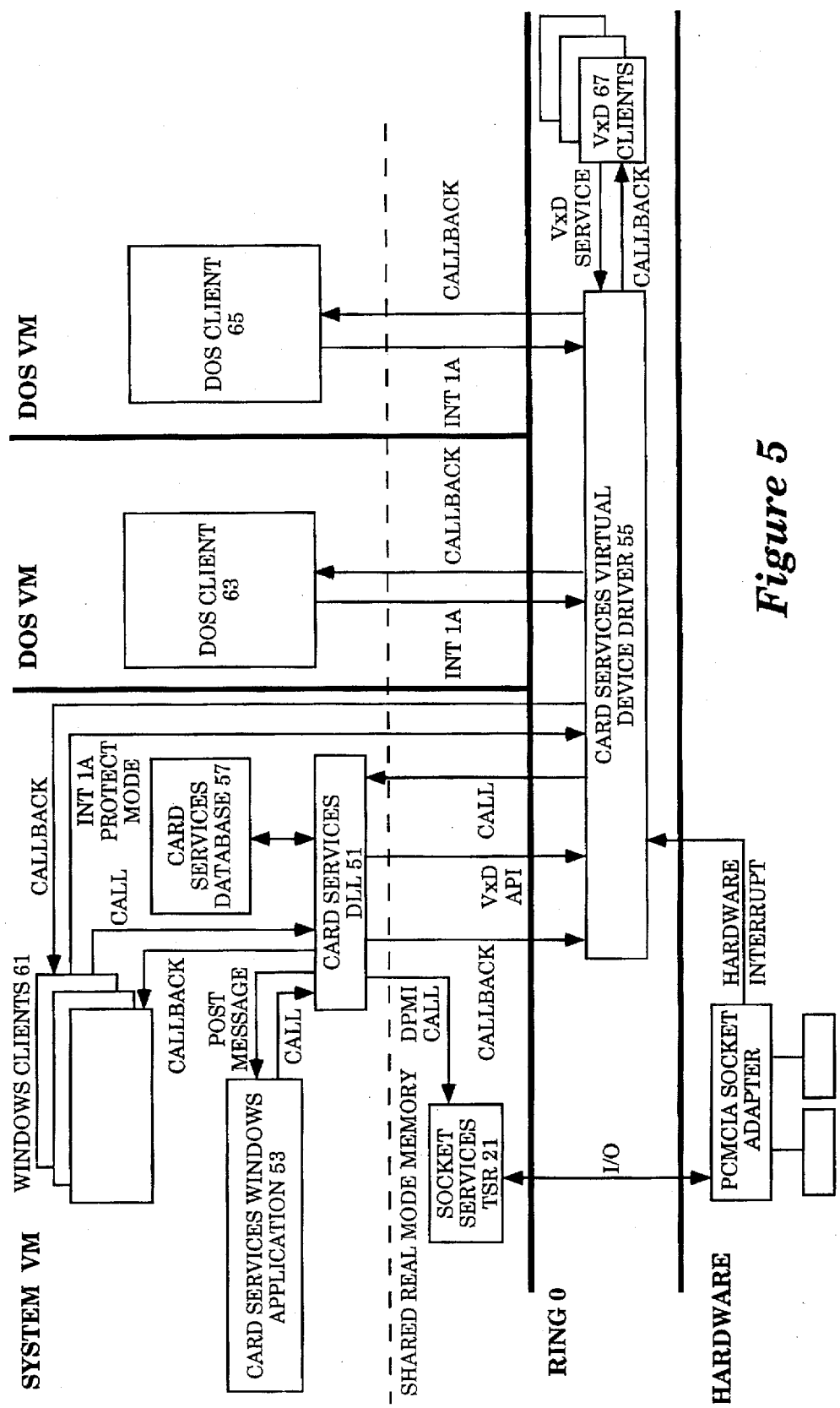
FIG. 5 is a block diagram of a fully protected mode implementation of Card Services within a conceptual diagram of Microsoft® Windows in enhanced mode.

A better method of providing a clean C function library interface into Card Services for Windows applications would be to create a fully protected mode version of Card Services. Referring to FIG. 5, a block diagram of a fully protected mode implementation of Card Services is presented. The protected mode Card Services implementation of the present invention uses the combination of a Windows Dynamic Linked Library (DLL) 51, a Windows application 53, and a Virtual Device Driver (VxD) 55.

The Dynamic Linked Library (DLL) 51 and the Windows application 53 form the core of the protected mode Card Services implementation of the present invention. The DLL 51 contains code that performs the Card Services functions. The Card Services functions are implemented with a DLL in order to allow several Windows applications to share the Card Services code. The Card Services DLL 51 maintains a database 57 of Card Services resources such that it can share the Card Services resources among clients of Card Services. Certain Card Services functions and hardware events require background processing. The Card Services implementation of the present invention uses the Windows application 53 to perform the required background processing.

A variety of Card Services requirements are provided by the Card Services Virtual Device Driver (VxD) 55 of the present invention. The Card Services Virtual Device Driver 55 provides a method of accessing the Card Services functions in the Card Services DLL 51 from DOS applications running in DOS virtual machines. The Virtual Device Driver (VxD) 55 also traps interrupts caused by PCMCIA socket adapters and calls the appropriate handling routine in the Card Services DLL 51. Finally the Virtual Device Driver (VxD) 55 also performs any functions that require system services, such as memory mapping, which are only available at ring 0. A complete description of the protected mode implementation of Card Services is provided in the copending application "*An Architecture for Implementing PCMCIA Card Services under the Windows Operating System in Enhanced Mode*", Ser. No. 08/631,950, filed concurrently herewith.

Referring to FIG. 5, the Card Services DLL 51 is illustrated within the system VM. Unlike the Card Services Translation DLL 81 of FIG. 4, the Card Services DLL 51 in FIG. 5 is a full implementation of Card Services such that no Card Services TSR is required. Since the Card Services DLL 51 is a full protected mode implementation of Card Services, there is no need to switch from protected mode into real mode to perform a Card Services function.

Since the Card Services DLL 51 is a centralized provider of Card Services functions to many different Card Services clients, the Card Services DLL 51 must allocate the available Card Services resources among the several the Card Services clients. To keep track of the available Card Services resources, the Card Services DLL 51 maintains a database 57 of the Card Services resources. When a Card Services client requests a resource, the Card Services DLL 51 checks the Card Services database 57 to see if the resource is available. If the resource is available, the Card Services DLL 51 gives the resource to the requesting client and marks the resource as unavailable in the Card Services database 57. When a Card Services client no longer needs a resource that was allocated to it, the Card Services client informs the Card Services DLL 51 that it no longer needs the resource. The Card Services DLL 51 then marks the resource as available in the Card Services database 57.

To configure and control the Socket adapter hardware the Card Services DLL 51 uses any Socket Services layers, such as the Socket Services TSR 21 in FIG. 5, that were loaded before Windows started. Note that any other type of Socket Services implementation such as a BIOS ROM extension or a device driver would also be acceptable.

The Card Services DLL 51 access the Socket Services TSR 21 in shared real mode memory using the DOS Protected Mode Interface (DPMI) provided by Windows as illustrated in FIG. 5. The actual address used to make the DOS Protected Mode Interface call is the address of the Socket Services real mode INT 1A chain. This address is provided to the Card Services DLL 51 during the initialization of the Card Services implementation.

When the Card Services DLL 51 calls the Socket Services layer using the DOS Protected Mode Interface, Card Services DLL 51 must make sure that all buffers passed to Socket Services are below the 1 megabyte real mode boundary. This must be done since the Socket Services TSR 21 runs in real mode and therefore cannot access any memory above the 1 megabyte real mode boundary.

Card Services C Function Library

For either the real mode Card Services system of FIG. 4 or the protected mode Card Services system of FIG. 5, the present invention provides a library of C functions. One C function is provide for each Card Services function such that a Windows Card Services client can request any Card Services function to be performed by calling the corresponding C function in the DLL. This section describes the Card Services C functional bindings of the present invention in detail.

The Card Services functions are listed here alphabetically. Each function is listed with the function parameters for ease of reference. Structure data types and enumerated types which are used as function parameters are defined. A complete description of each of these Card Services functions is available in section 5 of the *PCMCIA Card Services Interface Specification*, Release 2.00, September 1992, Personal Computer Memory Card International Association.

The following data types are used throughout this C Library of Card
Services functions.

```
// Types defined for internal and interface use
typedef unsigned char        BYTE;
typedef unsigned short       WORD;
typedef unsigned long        DWORD;

typedef WORD                 CSHANDLE;
typedef CSHANDLE             CLIENTHANDLE;
typedef CSHANDLE             TIMERHANDLE;
typedef CSHANDLE             SOCKETHANDLE;
typedef CSHANDLE             ERASEQUEHANDLE;
typedef CSHANDLE             MEMORYHANDLE;
typedef CSHANDLE             WINDOWHANDLE;
typedef CSHANDLE             MTDHANDLE;
```

AddSocketServices (32H)

```
extern int FAR CSAddSocketServices (SSFUNC ssEntry, tAddSSArg FAR *pArgs);

typedef int (FAR *SSFUNC)();

typedef struct tAddSSArg
{
        WORD            attributes;      // See tBindingAtttribute
        tDataPointer    dataPointer;     // Pointer for SS data
} tAddSSArg, FAR *tlpAddSSArg;

typedef enum tBindingAttribute
{
        baRealMode      = 0x0000,    // Real mode address
        ba1616          = 0x0001,    // Protected mode 16:16 address
        ba1632          = 0x0002,    // Protected mode 16:32 address,
        baFlat          = 0x0004     // Protected mode 32 bit address
} tBindingAttribute;

typedef struct tDataPointer
{
        WORD            data[4];
}       tDataPointer;
```

AdjustResourceInfo (35H)

extern int FAR CSAdjustResourceInfo (tAdjustResourceArg FAR *pArgs);

```
5   typedef struct tAdjustResourceArg
    {
        BYTE                action;        // See tResourceAction
        BYTE                type;          // See tResourceType
10      union
        {
            tAdjustMemArg   mem;           // Used if type == rtMemory
            tAdjustIOArg    IO;            // Used if type == rtIO
            tAdjustIRQArg   IRQ;           // Used if type == rtIRQ
        };                                 // Anonymous union
15  } tAdjustResourceArg, FAR *tlpAdjustResourceArg;

typedef enum tResourceAction
    {
20      raRemove            = 0x0000,      // Remove resource
        raAdd               = 0x0001       // Add resource
    } tResourceAction;

typedef enum tResourceType
    {
25      rtMemory            = 0x0000,      // System mappable memory range
        rtIO                = 0x0001,      // System mappable IO range
        rtIRQ               = 0x0002,      // System steerable IRQ
    } tResourceType;

30  typedef struct tAdjustMemArg
    {
        WORD                attributes;    // See tMemoryAttributes
        DWORD               base;          // System base address of mem range
        DWORD               size;          // Size of memory range in bytes
35  } tAdjustMemArg, FAR *tlpAdjustMemArg;

typedef enum tMemoryAttributes
    {
        maCommon            = 0x0000,      // Clear for common memory type
40      maAttribute         = 0x0001,      // Set for attribute memory type
        maExclusive         = 0x0002,      // Set for exclusive use
        maDisableErase      = 0x0004,      // Set to disable memory erase
        maVerify            = 0x0008,      // Set to verify after write
        maShared            = 0x0020       // Set to allow shared access
45  } tMemoryAttributes;

typedef struct tAdjustIOArg
    {
        WORD                basePort;      // Base port address of IO range
50      BYTE                numPorts;      // # of contiguous ports in IO range
        BYTE                attributes;    // See tIOAttributes
        BYTE                IOAddressLines;// # of IO address lines decoded
    } tAdjustIOArg, FAR *tlpAdjustIOArg;

55  typedef enum tIOAttributes
    {
        iaShared            = 0x0001       // Set to allow shared access
    } tIOAttributes;
```

```
typedef struct tAdjustIRQArg
{
    BYTE            attributes;  // See tIRQAttributes
    BYTE            IRQ;         // IRQ being adjusted
} tAdjustIRQArg, FAR *tlpAdjustIRQArg;

typedef enum tIRQAttributes
{
    qaExclusive              = 0x0000,   // Set for exclusive use of IRQ
    qaTimeMultiplexedSharing = 0x0001,   // Set for time multiplexed IRQ
    qaDynamicSharing         = 0x0002,   // Set for dynamically shared IRQ
    qaSharedIRQ              = 0x0003,   // Use as a mask to check share bits
    qaForcePulse             = 0x0004,   // Set to force pulse mode interrupt
    qaFirstShared            = 0x0008,   // Set if 1st client on shared IRQ
    qaPulseIRQAllocated      = 0x0100    // Set on ret. if pulse md interrupt
} tIRQAttributes;
```

CheckEraseQueue (26H)

```
extern int FAR CSCheckEraseQueue (ERASEQUEHANDLE queHandle);
```

CloseMemory (00H)

```
extern int FAR CSCloseMemory (MEMORYHANDLE memHandle);
```

CopyMemory (01H)

```
extern int FAR CSCopyMemory (MEMORYHANDLE memHandle, tCopyMemArg FAR *pArgs);

typedef struct tCopyMemArg
{
    DWORD    sourceOffset;   // Card source address
    DWORD    destOffset;     // Card destination address
    DWORD    count;          // Number of bytes to transfer
    WORD     attributes;     // See tMemoryAttributes
} tCopyMemArg, FAR *tlpCopyMemArg;

typedef enum tMemoryAttributes
{
    maCommon       = 0x0000,   // Clear for common memory type
    maAttribute    = 0x0001,   // Set for attribute memory type
    maExclusive    = 0x0002,   // Set for exclusive use
    maDisableErase = 0x0004,   // Set to disable memory erase
    maVerify       = 0x0008,   // Set to verify after write
    maShared       = 0x0020    // Set to allow shared access
} tMemoryAttributes;
```

DeregisterClient (02H)

extern int FAR CSDeregisterClient (CLIENTHANDLE clientHandle);

DeregisterEraseQueue (25H)

extern int FAR CSDeregisterEraseQueue (ERASEQUEHANDLE queHandle);

GetCardServicesInfo (0BH)

extern int FAR CSGetCardServicesInfo (tCSInfoArg FAR *pArgs);

```
typedef struct tCSInfoArg
{
        WORD        infoLen;            // Number of bytes returned by CS
        BYTE        signature[2];       // Set to 'CS' if CS installed
        WORD        numSockets;         // Number of sockets supported by CS
        WORD        revision;           // BCD value of vendor's CS revision
        WORD        csLevel;            // BCD value of CS release
        WORD        vStringOff;         // Offset of vendor string
        WORD        vStringLen;         // Length of vendor string (>=1)
//      BYTE        vendorString[N];    // Vendor string (ASCIIZ)
        BYTE        vendorString[240];// IMPLEMENTATION SPECIFIC
} tCSInfoArg, FAR *tlpCSInfoArg;
```

GetClientInfo(03H)

extern int FAR CSGetClientInfo (CLIENTHANDLE clientHandle, tGetClientInfoArg FAR *pArgs);

```
typedef struct tGetClientInfoArg
{
        WORD            maxLen;      // Maximum number of bytes allocated
        WORD            infoLen;     // Number of bytes needed by client
        WORD            attributes;  // See tClientAttributes
//      The tClientInfo0 structure can be used for sub-function 0
//      i.e. when (((attributes & caInfoSubFunctionMask) >> 8) == 0)
//      Otherwise, the format of the data is client specific.
//      The following example shows how the caller can use this structure.
//      typedef struct
//      {
//              tGetClientInfoArg   info;
//              char                dataBuffer[N];
//      } myClientInfo;
} tGetClientInfoArg, FAR *tlpGetClientInfoArg;

typedef enum tClientAttributes
{
        caMemoryClientDriver    = 0x0001,   // Set if memory client driver
        caMemoryTechnologyDriver= 0x0002,   // Set if MTD client
        caIOClientDriver        = 0x0004,   // Set if IO client
        caInsertionEventSharable= 0x0008,   // card ins events for shared cards
```

GetConfigurationInfo (04H)

```c
extern int FAR CSGetConfigurationInfo (CLIENTHANDLE FAR *pClientHandle,
                                       tConfigInfoArg FAR *pArgs);

typedef struct tConfigInfoArg
{
        WORD     socket;          // Logical socket number
        WORD     attributes;      // See tConfigAttributes
        BYTE     vcc;             // Vcc setting
        BYTE     vpp1;            // Vpp1 setting
        BYTE     vpp2;            // Vpp2 setting
        BYTE     interfaceType;   // See tInterfaceType
        DWORD    configBase;      // Card base address of config registers
        BYTE     status;          // Card Status reg if present
        BYTE     pin;             // Card Pin reg setting if present
        BYTE     copy;            // Card Copy reg setting if present
        BYTE     option;          // Card Option reg if present
        BYTE     presentRegs;     // Supprted card regs, See tCardRegisters BYTE     firstDevType;    // From Device ID tuple
        BYTE     funcCode;        // From Function ID tuple
        BYTE     sysInitMask;     // From Function ID tuple
        WORD     manufCode;       // From Manufacturer ID tuple
        WORD     manufInfo;       // From Manufacturer ID tuple
        BYTE     validRegs;       // Valid card regs, See tCardRegisters BYTE     assignedIRQ;     // IRQ assigned to Card, tIRQEnum
        WORD     IRQAttributes;   // See tIRQAttributes WORD     port1Base;       // Base port address for IO range 1
        BYTE     port1Size;       // # of contiguous ports in range 1
        BYTE     port1Attributes; // See tPortAttributes
        WORD     port2Base;       // Base port address for IO range 2
        BYTE     port2Size;       // # of contiguous ports in range 2
        BYTE     port2Attributes; // See tPortAttributes
        BYTE     IOAddressLines;  // # of IO address lines decoded
} tConfigInfoArg, FAR *tlpConfigInfoArg;

typedef enum tConfigAttributes
{
        caExclusiveUse      = 0x0001,   // Set if RequestExclusive granted
        caValidClient       = 0x0002,   // Set if RequestIRQ/IO/Config given
        caEnableIRQSteering = 0x0002,   // Set to enable IRQ steering
        caIRQChangeValid    = 0x0004,   // Set if IRQ steering to be changed
        caVccChangeValid    = 0x0008,   // Set if Vcc to be changed
        caVpp1ChangeValid   = 0x0010,   // Set if Vpp1 to be changed
        caVpp2ChangeValid   = 0x0020    // Set if Vpp2 to be changed
} tConfigAttributes;

typedef enum tCardRegisters
```

(Above preceding section:)

```
        caInsertionEventExclusive=0x0010  // card ins events for exclus. cards
//      caInfoSubFunctionMask    = 0xFF00 // Use as mask for attributes in
tClientInfoArg
} tClientAttributes;
```

```
{
    crOption              = 0x01,      // Set if option register valid
    crStatus              = 0x02,      // Set if status register valid
    crPin                 = 0x04,      // Set if pin register valid
    crCopy                = 0x08       // Set if copy register valid
} tCardRegisters;

typedef enum tInterfaceType
{
    itMemory              = 0x01,      // Set if memory only interface
    itMemoryAndIO         = 0x02       // Set if memory and IO interface
} tInterfaceType;

typedef enum tIRQEnum
{
    IRQ0                  = 0x0000,    // Enumerations for IRQ 0 to IRQ 15
    IRQ1                  = 0x0001,
    IRQ2                  = 0x0002,
    IRQ3                  = 0x0003,
    IRQ4                  = 0x0004,
    IRQ5                  = 0x0005,
    IRQ6                  = 0x0006,
    IRQ7                  = 0x0007,
    IRQ8                  = 0x0008,
    IRQ9                  = 0x0009,
    IRQ10                 = 0x000A,
    IRQ11                 = 0x000B,
    IRQ12                 = 0x000C,
    IRQ13                 = 0x000D,
    IRQ14                 = 0x000E,
    IRQ15                 = 0x000F,
    NMI                   = 0x0010,    // Non maskable interrupt
    IOCheck               = 0x0011,    // IO error interrupt
    BusError              = 0x0012,    // System bus error interrupt
    VendorSpecific        = 0x0013,    // Vendor specific interrupt
    InvalidIRQ            = 0x0014     // Invalid interrupt number >=
} tIRQEnum;

typedef enum tIRQAttributes
{
    qaExclusive           = 0x0000,    // Set for exclusive use of IRQ
    qaTimeMultiplexedSharing= 0x0001,  // Set for time multiplexed IRQ
    qaDynamicSharing      = 0x0002,    // Set for dynamically shared IRQ
    qaSharedIRQ           = 0x0003,    // Use as a mask to check share bits
    qaForcePulse          = 0x0004,    // Set to force pulse mode interrupt
    qaFirstShared         = 0x0008,    // Set to be 1st client on shard IRQ
    qaPulseIRQAllocated   = 0x0100     // Set on return if pulse mode intrrpt
} tIRQAttributes;

typedef enum tPortAttributes
{
    paSharable            = 0x01,      // Set if port can be shared
    paFirstShared         = 0x02,      // Set to be 1st client on shard prt
    paForceAliasAccess    = 0x04,      // Set to check aliased addrs also
    pa16BitIO             = 0x08       // Set if port supprts 16 bit access
} tPortAttributes;
```

GetEventMask (2EH)

```
extern int FAR CSGetEventMask (CLIENTHANDLE clientHandle, tEventMaskArg FAR *pArgs);

typedef struct tEventMaskArg
{
        WORD            attributes;  // See tSocketAttributes
        WORD            eventMask;   // Current/new evnt mask, tEventMask
        WORD            socket;      // Logical socket number
} tEventMaskArg, FAR *tlpEventMaskArg;

typedef enum tSocketAttributes
{
        saGlobalMask    = 0x0000,    // Clear to access global event mask
        saSocketMask    = 0x0001,    // Set to access socket event mask saAllClients    = 0x0000,    // Clear to access all clients
        saSocketClients = 0x0001     // Set to access clients on socket
} tSocketAttributes;

typedef enum tEventMask
{
        emWriteProtectChange= 0x0001,  // Set to be told of wrte protect chngs
        emCardLockChange    = 0x0002,  // Set to be notified of card lock changes
        emEjectionRequest   = 0x0004,  // Set to be notified of ejection requests
        emInsertionRequest= 0x0008,    // Set to be notified of insertion reqs
        emBatteryDead       = 0x0010,  // Set to be notified of battry dead evnts
        emBatteryLow        = 0x0020,  // Set to be notified of battery low evnts
        emReadyChange       = 0x0040,  // Set to be notified of card ready chnges
        emCardDetectChange= 0x0080,    // Set to be notified of card detect chngs
        emPowerManagementChange = 0x0100, // Set to be told power mngmnt chnges
        emReset             = 0x0200,  // Set to be notified of card reset events
        emSSUpdate          = 0x0400   // Set to be notified of SS update calls
} tEventMask;
```

GetFirstClient (0EH)

```
extern int FAR CSGetFirstClient (CLIENTHANDLE FAR *clientHandle, tClientArg FAR *pArgs);

typedef struct tClientArg
{
        WORD            socket;      // Logical socket number
        WORD            attributes;  // See tSocketAttributes
} tClientArg, FAR *tlpClientArg;

typedef enum tSocketAttributes
{
        saGlobalMask    = 0x0000,    // Clear to access global event mask
        saSocketMask    = 0x0001,    // Set to access socket event mask saAllClients    = 0x0000,    // Clear to access all clients
        saSocketClients = 0x0001     // Set to access clients on socket
} tSocketAttributes;
```

GetFirstPartition (05H)

```
    extern int FAR CSGetFirstPartition (tGetPartitionArg FAR *pArgs);

typedef struct tGetPartitionArg
    {
        WORD     socket;              // Logical socket number
        WORD     attributes;          // See tPartitionAttributes
        BYTE     tupleMask;           // See tTupleMask
        BYTE     accessSpeed;         // Window speed, See tAccessSpeed
        WORD     flags;               // These 3 fields are set and used by
        DWORD    linkOffset;          // CS. The caller should not modify them
        DWORD    CISOffset;           // betwn calls to GetFirst/NextPartition.
        DWORD    cardOffset;          // Card offset to memory region
        DWORD    partitionSize;       // Size of partition in bytes
        DWORD    eraseBlockSize;      // Erase block size in bytes
        WORD     paritionMultiple;    // Minimum partition size in blocks
        WORD     JEDECID;             // JEDEC identifier of device in partition
        WORD     paritionType;        // See tPartitionType
    } tGetPartitionArg, FAR *tlpGetPartitionArg;

typedef enum tPartitionAttributes
    {
        paCommon              = 0x0000,  // Clear if common memory partition
        paAttribute           = 0x0001,  // Set if attribute memory partition
        paVirtualPartition    = 0x0100,  // Set if virtual partition
        paWriteWithoutErase   = 0x0000,  // Clear if write without erase
        paWriteWithErase      = 0x0200,  // Set if erase before writes
        paWriteDisableableErase = 0x0600, // Set if erse can be disbld b4 wrts
        paWriteWithVerify     = 0x0800,  // Set if verify after writes
        paEraseSupported      = 0x1000   // Set if erase requests supported
    } tPartitionAttributes;

typedef enum tTupleMask
    {
        tmAccessSpeed         = 0x01,    // Set if accessSpeed from tuples
        tmCardOffset          = 0x02,    // Set if cardOffset from tuples
        tmPartitionSize       = 0x04,    // Set if partitionSize from tuples
        tmEraseBlockSize      = 0x08,    // Set if eraseBlockSize from tuples
        tmPartitionMultiple   = 0x10,    // Set if paritionMultiple frm tples
        tmJedecId             = 0x20,    // Set if jedecId from tuples
        tmPartType            = 0x40     // Set if paritionType from tuples
    } tTupleMask;

typedef enum tAccessSpeed
    {
        as250ns               = 0x01,    // If speedMantissa == 0 the device
        as200ns               = 0x02,    // access speed is given by one of
        as150ns               = 0x03,    // these default values; otherwise,
        as100ns               = 0x04,    // these bits form the exponent part
        asSpeedExponent       = 0x07,    // Use as mask if speedMantissa !=0
        asSpeedMantissa       = 0x78,    // Use as a mask for mantissa part.
        asUseWaitState        = 0x80     // Set to use wait state (if avail.)
    } tAccessSpeed;

typedef enum tPartitionType
    {
```

```
        ptNoPartitionInfo   = 0x0000,   // Clear if no partition info found
        ptFATPartition      = 0x0001,   // Set if DOS BPB/FAT partition found
        ptFFS1Partition     = 0x0002,   // Set if FFS type 1 partition found
        ptFFS2Partition     = 0x0003,   // Set if FFS type 2 partition found
        ptXIPPartition      = 0x0004,   // Set if XIP partition found
        ptUnknownPartition  = 0x7FFF    // Set if unknown partition found
} tPartitionType;
```

GetFirstRegion (06H)

extern int FAR CSGetFirstRegion (MTDHANDLE FAR *pMTDHandle, tGetRegionArg FAR *pArgs);

```
typedef struct tGetRegionArg
{
        WORD    socket;             // Logical socket number
        WORD    attributes;         // See tRegionAttributes
        BYTE    tupleMask;          // See tTupleMask
        BYTE    accessSpeed;        // Window speed. See tAccessSpeed
        WORD    flags;              // These 3 fields are set and used by
        DWORD   linkOffset;         // CS. The caller should not modify them
        DWORD   CISOffset;          // between calls to GetFirst/NextRegion.
        DWORD   cardOffset;         // Card offset to memory region
        DWORD   regionSize;         // Size of region in bytes
        DWORD   eraseBlockSize;     // Erase block size in bytes
        WORD    partitionMultiple;  // Minimum partition size in blocks
        WORD    JEDECID;            // JEDEC identifier of memory region
} tGetRegionArg, FAR *tlpGetRegionArg;

typedef enum tRegionAttributes
{
        raCommon               = 0x0000,   // Clear if common memory region
        raAttribute            = 0x0001,   // Set if attribute memory region
        raDeleteRegion         = 0x0002,   // See tSetRegionArg
        raVirtualRegion        = 0x0100,   // Set if virtual region
        raWriteWithoutErase    = 0x0000,   // Clear if write without erase
        raWriteWithErase       = 0x0200,   // Set if erase before writes
        raWriteDisableableErase= 0x0600,   // Set if erse can be disbld b4 wrts
        raWriteWithVerify      = 0x0800,   // Set if verify after writes
        raEraseSupported       = 0x1000    // Set if erase requests supported
} tRegionAttributes;

typedef enum tTupleMask
{
        tmAccessSpeed       = 0x01,   // Set if accessSpeed from tuples
        tmCardOffset        = 0x02,   // Set if cardOffset from tuples
        tmPartitionSize     = 0x04,   // Set if partitionSize from tuples
        tmEraseBlockSize    = 0x08,   // Set if eraseBlockSize from tuples
        tmPartitionMultiple = 0x10,   // Set if partitionMultiple frm tupls
        tmJedecId           = 0x20,   // Set if jedecId from tuples
        tmPartType          = 0x40    // Set if paritionType from tuples
} tTupleMask;

typedef enum tAccessSpeed
{
        as250ns   = 0x01,   // If speedMantissa == 0 the device
        as200ns   = 0x02,   // access speed is given by one of
```

```
        as150ns          = 0x03,    // these default values; otherwise,
        as100ns          = 0x04,    // these bits form the exponent part
        asSpeedExponent  = 0x07,    // Use as mask if speedMantissa !=0
        asSpeedMantissa  = 0x78,    // Use as a mask for mantissa part.
        asUseWaitState   = 0x80     // Set to use wait state (if avail.)
} tAccessSpeed;
```

GetFirstTuple (07H)

```
extern int FAR CSGetFirstTuple (tGetTupleArg FAR *pArgs);

typedef struct tGetTupleArg
{
        WORD     socket;             // Logical socket number
        WORD     attributes;         // See tTupleAttributes
        BYTE     desiredTuple;       // Tuple code to be located (0xFF == all)
        BYTE     tupleOffset;        // Index into tuple data for GetTupleData
        WORD     flags;              // These 3 fields are set and used by
        DWORD    linkOffset;         // CS. The caller should not modify them
        DWORD    CISOffset;          // between calls to GetFirst/NextTuple.
        union
        {
                struct
                {
                        BYTE    tupleCode;      // Tuple code found
                        BYTE    tupleLink;      // Tuple link field
                };                              // Anonymous structure
                WORD    tupleDataMax;           // Maximum size allocated for tuple data
        };                                      // Anonymous union
        WORD     tupleDataLen;                  // Size of tuple returned by GetTupleData
        BYTE     tupleData[MAX_TUPLE_DATA];     // IMPLEMENTATION SPECIFIC
} tGetTupleArg, FAR *tlpGetTupleArg;

typedef enum tTupleAttributes
{
        taGetData    = 0x0000,    // Clear to return data tuples only
        taGetLink    = 0x0001     // Set to return link tuples also
} tTupleAttributes;
```

GetNextClient (2AH)

```
extern int FAR CSGetNextClient (CLIENTHANDLE FAR *clientHandle, tClientArg FAR *pArgs);

typedef struct tClientArg
{
        WORD     socket;         // Logical socket number
        WORD     attributes;     // See tSocketAttributes
} tClientArg, FAR *tlpClientArg;
```

GetNextPartition (08H)

extern int FAR CSGetNextPartition (tGetPartitionArg FAR *pArgs);

```
typedef struct tGetPartitionArg
{
        WORD        socket;              // Logical socket number
        WORD        attributes;          // See tPartitionAttributes
        BYTE        tupleMask;           // See tTupleMask
        BYTE        accessSpeed;         // Window speed, See tAccessSpeed
        WORD        flags;               // These 3 fields are set and used by
        DWORD       linkOffset;          // CS. The caller should not modify them
        DWORD       CISOffset;           // betwn calls to GetFirst/NextPartition.
        DWORD       cardOffset;          // Card offset to memory region
        DWORD       partitionSize;       // Size of partition in bytes
        DWORD       eraseBlockSize;      // Erase block size in bytes
        WORD        paritionMultiple;    // Minimum partition size in blocks
        WORD        JEDECID;             // JEDEC identifier of device in partition
        WORD        paritionType;        // See tPartitionType
} tGetPartitionArg, FAR *tlpGetPartitionArg;

typedef enum tPartitionAttributes
{
        paCommon               = 0x0000,    // Clear if common memory partition
        paAttribute            = 0x0001,    // Set if attribute memory partition
        paVirtualPartition     = 0x0100,    // Set if virtual partition
        paWriteWithoutErase    = 0x0000,    // Clear if write without erase
        paWriteWithErase       = 0x0200,    // Set if erase before writes
        paWriteDisableableErase= 0x0600,    // Set if eras can be disbld b4 wrts
        paWriteWithVerify      = 0x0800,    // Set if verify after writes
        paEraseSupported       = 0x1000     // Set if erase requests supported
} tPartitionAttributes;

typedef enum tTupleMask
{
        tmAccessSpeed       = 0x01,    // Set if accessSpeed from tuples
        tmCardOffset        = 0x02,    // Set if cardOffset from tuples
        tmPartitionSize     = 0x04,    // Set if partitionSize from tuples
        tmEraseBlockSize    = 0x08,    // Set if eraseBlockSize from tuples
        tmPartitionMultiple = 0x10,    // Set if partitionMultiple frm tupls
        tmJedecId           = 0x20,    // Set if jedecId from tuples
        tmPartType          = 0x40     // Set if paritionType from tuples
} tTupleMask;

typedef enum tAccessSpeed
{
        as250ns         = 0x01,    // If speedMantissa == 0 the device
        as200ns         = 0x02,    // access speed is given by one of
        as150ns         = 0x03,    // these default values; otherwise,
        as100ns         = 0x04,    // these bits form the exponent part
        asSpeedExponent = 0x07,    // Use as mask if speedMantissa != 0
        asSpeedMantissa = 0x78,    // Use as a mask for mantissa part.
        asUseWaitState  = 0x80     // Set to use wait state (if avail.)
} tAccessSpeed;

typedef enum tPartitionType
{
        ptNoPartitionInfo = 0x0000,    // Clear if no partition info found
        ptFATPartition    = 0x0001,    // Set if DOS BPB/FAT partition found
        ptFFS1Partition   = 0x0002,    // Set if FFS type 1 partition found
        ptFFS2Partition   = 0x0003,    // Set if FFS type 2 partition found
```

```
        ptXIPPartition      = 0x0004,     // Set if XIP partition found
        ptUnknownPartition  = 0x7FFF      // Set if unknown partition found
} tPartitionType;
```

GetNextRegion (09H)

```
extern int FAR CSGetNextRegion (MTDHANDLE FAR *pMTDHandle, tGetRegionArg FAR *pArgs);

typedef struct tGetRegionArg
{
        WORD     socket;              // Logical socket number
        WORD     attributes;          // See tRegionAttributes
        BYTE     tupleMask;           // See tTupleMask
        BYTE     accessSpeed;         // Window speed, See tAccessSpeed
        WORD     flags;               // These 3 fields are used by CS.
        DWORD    linkOffset;          // The caller should not modify them
        DWORD    CISOffset;           // betwn calls to GetFirst/NextRegion.
        DWORD    cardOffset;          // Card offset to memory region
        DWORD    regionSize;          // Size of region in bytes
        DWORD    eraseBlockSize;      // Erase block size in bytes
        WORD     paritionMultiple;    // Minimum partition size in blocks
        WORD     JEDECID;             // JEDEC identifier of memory region
} tGetRegionArg, FAR *tlpGetRegionArg;

typedef enum tRegionAttributes
{
        raCommon              = 0x0000,    // Clear if common memory region
        raAttribute           = 0x0001,    // Set if attribute memory region
        raDeleteRegion        = 0x0002,    // See tSetRegionArg
        raVirtualRegion       = 0x0100,    // Set if virtual region
        raWriteWithoutErase   = 0x0000,    // Clear if write without erase
        raWriteWithErase      = 0x0200,    // Set if erase before writes
        raWriteDisableableErase = 0x0600,  // Set if eras can be disbld b4 wrts
        raWriteWithVerify     = 0x0800,    // Set if verify after writes
        raEraseSupported      = 0x1000     // Set if erase requests supported
} tRegionAttributes;

typedef enum tTupleMask
{
        tmAccessSpeed       = 0x01,    // Set if accessSpeed from tuples
        tmCardOffset        = 0x02,    // Set if cardOffset from tuples
        tmPartitionSize     = 0x04,    // Set if partitionSize from tuples
        tmEraseBlockSize    = 0x08,    // Set if eraseBlockSize from tuples
        tmPartitionMultiple = 0x10,    // Set if paritionMultiple frm tupls
        tmJedecId           = 0x20,    // Set if jedecId from tuples
        tmPartType          = 0x40     // Set if paritionType from tuples
} tTupleMask;

typedef enum tAccessSpeed
{
        as250ns          = 0x01,    // If speedMantissa == 0 the device
        as200ns          = 0x02,    // access speed is given by one of
        as150ns          = 0x03,    // these default values; otherwise,
        as100ns          = 0x04,    // these bits form the exponent part
        asSpeedExponent  = 0x07,    // Use as mask if speedMantissa != 0
        asSpeedMantissa  = 0x78,    // Use as a mask for mantissa part.
```

```
        asUseWaitState    = 0x80      // Set to use wait state (if avail.)
} tAccessSpeed;
```

GetNextTuple (0AH)

```
extern int FAR CSGetNextTuple (tGetTupleArg FAR *pArgs);

typedef struct tGetTupleArg
{
        WORD      socket;            // Logical socket number
        WORD      attributes;        // See tTupleAttributes
        BYTE      desiredTuple;      // Tuple code to be located (0xFF == all)
        BYTE      tupleOffset;       // Index into tuple data for GetTupleData
        WORD      flags;             // These 3 fields are set and used by
        DWORD     linkOffset;        // CS. The caller should not modify them
        DWORD     CISOffset;         // between calls to GetFirst/NextTuple.
    union
    {
        struct
        {
          BYTE    tupleCode;         // Tuple code found
          BYTE    tupleLink;         // Tuple link field
        };                           // Anonymous structure
        WORD      tupleDataMax;      // Maximum size allocated for tuple data
    };                               // Anonymous union
        WORD      tupleDataLen;      // Size of tuple returned by GetTupleData
        BYTE      tupleData[MAX_TUPLE_DATA];    // IMPLEMENTATION SPECIFIC
} tGetTupleArg, FAR *tlpGetTupleArg;

typedef enum tTupleAttributes
{
        taGetData      = 0x0000,     // Clear to return data tuples only
        taGetLink      = 0x0001      // Set to return link tuples also
} tTupleAttributes;
```

GetStatus (0CH)

```
extern int FAR CSGetStatus (tGetStatusArg FAR *pArgs);

typedef struct tGetStatusArg
{
        WORD      socket;            // Logical socket number
        WORD      cardState;         // Current state of Card, See tStateMask
        WORD      socketState;       // Changes in socket state, See tStateMask
} tGetStatusArg, FAR *tlpGetStatusArg;

typedef enum tStateMask
{
        smWriteProtected  = 0x0001,  // Set if write protect enabled or changed
        smCardLocked      = 0x0002,  // Set if card lock enabled or changed
        smEjectionRequest = 0x0004,  // Set if card eject requested or pending
        smInsertionRequest= 0x0008,  // Set if card insert requested or pending
        smBatteryDead     = 0x0010,  // Set if battery dead or becomes live
        smBatteryLow      = 0x0020,  // Set if battery low or becomes live
```

```
        smCardReady        = 0x0040,    // Set if card Ready/Busy or changed
        smCardDetected     = 0x0080     // Set if card detected or changed
} tStateMask;
```

GetTupleData (0DH)

```
extern int FAR CSGetTupleData (tGetTupleArg FAR *pArgs);

typedef struct tGetTupleArg
{
        WORD       socket;          // Logical socket number
        WORD       attributes;      // See tTupleAttributes
        BYTE       desiredTuple;    // Tuple code to be located (0xFF == all)
        BYTE       tupleOffset;     // Index into tuple data for GetTupleData
        WORD       flags;           // These 3 fields are set and used by
        DWORD      linkOffset;      // CS. The caller should not modify them
        DWORD      CISOffset;       // between calls to GetFirst/NextTuple.
    union
    {
        struct
        {
           BYTE    tupleCode;       // Tuple code found
           BYTE    tupleLink;       // Tuple link field
        };                          // Anonymous structure
        WORD       tupleDataMax;    // Maximum size allocated for tuple data
    };                              // Anonymous union
        WORD       tupleDataLen;    // Size of tuple returned by GetTupleData
        BYTE       tupleData[MAX_TUPLE_DATA];   // IMPLEMENTATION SPECIFIC
} tGetTupleArg, FAR *tlpGetTupleArg;

typedef enum tTupleAttributes
{
        taGetData   = 0x0000,       // Clear to return data tuples only
        taGetLink   = 0x0001        // Set to return link tuples also
} tTupleAttributes;
```

MapLogSocket (12H)

```
extern int FAR CSMapLogSocket        (tMapSocketArg FAR *pArgs)

typedef struct tMapSocketArg
{
        WORD       logSocket;       // Logical socket number
        BYTE       phyAdapter;      // Physical (SS) adapter number
        BYTE       phySocket;       // Physical (SS) socket number
} tMapSocketArg, FAR *tlpMapSocketArg;
```

MapLogWindow (13H)

```
extern int FAR CSMapLogWindow (WINDOWHANDLE winHandle, tMapWindowArg FAR *pArgs);

typedef struct tMapWindowArg
```

```
{
    BYTE        phyAdapter;     // Physical (SS) adapter number
    BYTE        phyWindow;      // Physical (SS) window number
} tMapWindowArg, FAR *tlpMapWindowArg;
```

MapMemPage (14H)

```
extern int FAR CSMapMemPage (WINDOWHANDLE winHandle, tMapMemPageArg FAR *pArgs);

typedef struct tMapMemPageArg
{
    DWORD       cardOffset;     // Card offset to beginning of page
    BYTE        pageNumber;     // Page number to be aligned to cardOffset
} tMapMemPageArg, FAR *tlpMapMemPageArg;
```

MapPhySocket (15H)

```
extern int FAR CSMapPhySocket (tMapSocketArg FAR *pArgs);

typedef struct tMapSocketArg
{
    WORD        logSocket;      // Logical socket number
    BYTE        phyAdapter;     // Physical (SS) adapter number
    BYTE        phySocket;      // Physical (SS) socket number
} tMapSocketArg, FAR *tlpMapSocketArg;
```

MapPhyWindow (16H)

```
extern int FAR CSMapPhyWindow (WINDOWHANDLE FAR *pWinHandle,
                               tMapWindowArg FAR *pArgs);

typedef struct tMapWindowArg
{
    BYTE        phyAdapter;     // Physical (SS) adapter number
    BYTE        phyWindow;      // Physical (SS) window number
} tMapWindowArg, FAR *tlpMapWindowArg;
```

ModifyConfiguration (27H)

```
extern int FAR CSModifyConfiguration (CLIENTHANDLE clientHandle, tModifyConfigArg FAR
                                      *pArgs);

typedef struct tModifyConfigArg
{
    WORD        socket;         // Logical socket number
    WORD        attributes;     // See tConfigAttributes
    BYTE        vcc;            // Vcc setting
    BYTE        vpp1;           // Vpp1 setting
    BYTE        vpp2;           // Vpp2 setting
```

```
} tModifyConfigArg, FAR *tlpModifyConfigArg;

typedef enum tConfigAttributes
{
    caExclusiveUse       = 0x0001,    // Set if RequestExclusive granted
    caValidClient        = 0x0002,    // Set if RequestIRQ/IO/Config granted
    caEnableIRQSteering  = 0x0002,    // Set to enable IRQ steering
    caIRQChangeValid     = 0x0004,    // Set if IRQ steering to be changed
    caVccChangeValid     = 0x0008,    // Set if Vcc to be changed
    caVpp1ChangeValid    = 0x0010,    // Set if Vpp1 to be changed
    caVpp2ChangeValid    = 0x0020     // Set if Vpp2 to be changed
} tConfigAttributes;
```

ModifyWindow (17H)

```
extern int FAR CSModifyWindow (WINDOWHANDLE winHandle,
                               tModifyWindowArg FAR *pArgs)

typedef struct tModifyWindowArg
{
    WORD    attributes;       // See tWindowAttributes
    BYTE    accessSpeed;      // Window speed, See tAccessSpeed
} tModifyWindowArg, FAR *tlpModifyWindowArg;

typedef enum tWindowAttributes
{
    waCommon             = 0x0000,   // Clear if window is in common memory
    waIOWindow           = 0x0001,   // Set if window is for IO
    waAttribute          = 0x0002,   // Set if window is in attribute memory
    waEnabled            = 0x0004,   // Set if window is to be enabled
    waSpeedValid         = 0x0008,   // Set if accessSpeed valid ModifyWindow
    wa16BitAccess        = 0x0008,   // Set if memory supports 16 bit access
    waPaged              = 0x0010,   // Set if window must be a multiple of 4K
    waShared             = 0x0020,   // Set if memory area can be shared
    waFirstShared        = 0x0040,   // Set to be first client on shared memory
    waOffsetIsWindowSize = 0x0100    // Set if RequestWindow offsets = windw sz
} tWindowAttributes;

typedef enum tAccessSpeed
{
    as250ns          = 0x01,   // If speedMantissa == 0 the device
    as200ns          = 0x02,   // access speed is given by one of
    as150ns          = 0x03,   // these default values; otherwise,
    as100ns          = 0x04,   // these bits form the exponent part.
    asSpeedExponent  = 0x07,   // Use as a mask if speedMantissa != 0
    asSpeedMantissa  = 0x78,   // Use as a mask for mantissa part.
    asUseWaitState   = 0x80    // Set to use wait state (if available)
} tAccessSpeed;
```

OpenMemory (18H)

```
extern int FAR CSOpenMemory (MEMORYHANDLE FAR *pMemHandle, tOpenMemArg FAR
                             *pArgs);
```

```
typedef struct tOpenMemArg
{
    WORD    socket;        // Logical socket number
    WORD    attributes;    // See tMemoryAttributes
    DWORD   offset:        // Card offset of memory to open
} tOpenMemArg, FAR *tlpOpenMemArg;

typedef enum tMemoryAttributes
{
    maCommon        = 0x0000,   // Clear for common memory type
    maAttribute     = 0x0001,   // Set for attribute memory type
    maExclusive     = 0x0002,   // Set for exclusive use
    maDisableErase  = 0x0004,   // Set to disable memory erase
    maVerify        = 0x0008,   // Set to verify after write
    maShared        = 0x0020    // Set to allow shared access
} tMemoryAttributes;
```

ReadMemory (19H)

```
extern int FAR CSReadMemory (MEMORYHANDLE memHandle, BYTE FAR *buffer,
                             tReadMemArg FAR *pArgs);

typedef struct tReadMemArg
{
    DWORD   offset;     // Card offset of memory to read
    DWORD   count;      // Number of bytes to read
} tReadMemArg, FAR *tlpReadMemArg;
```

RegisterClient (10H)

```
extern int FAR CSRegisterClient (CLIENTHANDLE FAR *clientHandle,
                                 CSCALLBACK callBack,
                                 tRegisterClientArg FAR *pArgs)

typedef int (FAR *CSCALLBACK)(WORD, WORD, WORD, void FAR *, void FAR *, WORD,
                              void FAR *);

typedef struct tRegisterClientArg
{
    WORD            attributes;  // See tClientAttributes
    WORD            eventMask;   // See tEventMask
    tDataPointer    clientData;  // Data for the client (binding specific)
    WORD            version;     // CS version this client expects
} tRegisterClientArg, FAR *tlpRegisterClientArg;

typedef enum tClientAttributes
{
    caMemoryClientDriver      = 0x0001,   // Set if memory client driver
    caMemoryTechnologyDriver  = 0x0002,   // Set if MTD client
    caIOClientDriver          = 0x0004,   // Set if IO client
    caInsertionEventSharable  = 0x0008,   // card ins evnts for sharable cards
    caInsertionEventExclusive = 0x0010    // card ins events for exclus. cards
//  caInfoSubFunctionMask     = 0xFF00    // Use as mask for attributes in
tClientInfoArg
```

```
} tClientAttributes;

typedef enum tEventMask
{
    emWriteProtectChange= 0x0001,  // Set to be told of wrte protect chngs
    emCardLockChange   = 0x0002,   // Set to be notified of card lock changes
    emEjectionRequest  = 0x0004,   // Set to be notified of ejection requests
    emInsertionRequest = 0x0008,   // Set to be notified of insertion reqs
    emBatteryDead      = 0x0010,   // Set to be notified of battry dead evnts
    emBatteryLow       = 0x0020,   // Set to be notified of battery low evnts
    emReadyChange      = 0x0040,   // Set to be notified of card ready chnges
    emCardDetectChange = 0x0080,   // Set to be notified of card detect chngs
    emPowerManagementChange=0x0100, // Set to be told power mangmnt changes
    emReset            = 0x0200,   // Set to be notified of card reset events
    emSSUpdate         = 0x0400    // Set to be notified of SS update calls
} tEventMask;

typedef struct tDataPointer
{
    WORD   data[4];   // Client specific binding information
} tDataPointer;
```

RegisterEraseQueue (0FH)

```
extern int FAR CSRegisterEraseQueue (ERASEQUEHANDLE FAR *pQueHandle,
                                     tEraseQueueHeader FAR *pQueHeader);

typedef struct tEraseQueueHeader
{
    WORD   queueEntryLen;    // Length in bytes of an erase queue entry
    WORD   queueEntryCnt;    // Number of entries in the erase queue
//  tEraseQueueEntry queueEntryArray[N]; // Array of erase queue entries
} tEraseQueueHeader, FAR *tlpEraseQueueHeader;

typedef struct tEraseQueueEntry
{
    WORD   handle;       // Memory handle
    BYTE   state;        // See tEntryState
    BYTE   size;         // Size of area to erase (power of 2)
    DWORD  offset;       // Offset of area to erase
//  BYTE   clientData[N]; // Additional bytes for client use
} tEraseQueueEntry, FAR *tlpEraseQueueEntry;

typedef enum tEntryState
{
    esIdle               = 0x00FF,   // Erase queue entry is idle
    esQueuedForErase     = 0x0000,   // Entry is queued for erasure
    esEraseInProgress    = 0x007F,   // CS is processing this entry
    esErasePassed        = 0x00E0,   // CS succeeded in processing this entry
    esEraseFailed        = 0x00E1,   // CS failed while processing this entry
    esMediaWriteProtected=0x0084,   // Erase failed due to invalid setup:
    esMediaNotEraseable  = 0x0086,  //    These errors usually indicate a
    esMediaMissing       = 0x0080,  //    temporary condition which can be
    esMediaNotWriteable  =0x0087,   //    corrected by the user
    esBadSocket          = 0x00C3,  // Erase failed due to bad parameters:
    esBadTechnology      = 0x00C2,  //    These errors usually indicate an
```

```
        esBadOffset        = 0x00C1,    //  error in the client software and
        esBadVcc           = 0x00C4,    //  are generally not correctable by
        esBadVpp           = 0x00C5,    //  the user.
        esBadSize          = 0x00C6     //  "
) tEntryState;
```

RegisterMTD (1AH)

`extern int FAR CSRegisterMTD (CLIENTHANDLE clientHandle, tRegisterMTDArg FAR *pArgs);`

```
typedef struct tRegisterMTDArg
{
        WORD       socket;         // Logical socket number
        WORD       attributes;     // See tRegionAttributes
        DWORD      cardOffset;     // Card offset for region MTD supports
        WORD       MTDmediaId;     // Token for MTD use to identify media
) tRegisterMTDArg, FAR *tlpRegisterMTDArg;

typedef enum tRegionAttributes
{
        raCommon            = 0x0000,   // Clear if common memory region
        raAttribute         = 0x0001,   // Set if attribute memory region
        raDeleteRegion      = 0x0002,   // See tSetRegionArg
        raVirtualRegion     = 0x0100,   // Set if virtual region
        raWriteWithoutErase = 0x0000,   // Clear if write without erase
        raWriteWithErase    = 0x0200,   // Set if erase before writes
        raWriteDisableableErase= 0x0600, // Set if eras can be disabld b4 writes
        raWriteWithVerify   = 0x0800,   // Set if verify after writes
        raEraseSupported    = 0x1000    // Set if erase requests supported
} tRegionAttributes;
```

RegisterTimer (28H)

`extern int FAR CSRegisterTimer (TIMERHANDLE FAR *pTimerHandle, WORD FAR *waitTics);`

ReleaseConfiguration (1EH)

`extern int FAR CSReleaseConfiguration (CLIENTHANDLE clientHandle, tClientArg FAR *pArgs);`

```
typedef struct tClientArg
{
        WORD       socket;         // Logical socket number
        WORD       attributes;     // See tSocketAttributes
} tClientArg, FAR *tlpClientArg;

typedef enum tSocketAttributes
{
        saGlobalMask        = 0x0000,   // Clear to access global event mask
        saSocketMask        = 0x0001,   // Set to access socket event mask saAllClients        = 0x0000,   // Clear to access all clients
        saSocketClients     = 0x0001    // Set to access clients on socket
```

} tSocketAttributes;

ReleaseExclusive (2DH)

extern int FAR CSReleaseExclusive (CLIENTHANDLE clientHandle, tClientArg FAR *pArgs);

```
typedef struct tClientArg
{
        WORD            socket;         // Logical socket number
        WORD            attributes;     // See tSocketAttributes
} tClientArg, FAR *tlpClientArg;

typedef enum tSocketAttributes
{
        saGlobalMask    = 0x0000,       // Clear to access global event mask
        saSocketMask    = 0x0001,       // Set to access socket event mask saAllClients    = 0x0000,       // Clear to access all clients
        saSocketClients = 0x0001        // Set to access clients on socket
} tSocketAttributes;
```

ReleaseIO (1BH)

extern int FAR CSReleaseIO (CLIENTHANDLE clientHandle, tIOArg FAR *pArgs);

```
typedef struct tIOArg
{
        WORD            socket;         // Logical socket number
        WORD            port1Base;      // Base port address for IO range 1
        BYTE            port1Size;      // Number of contiguous ports in range 1
        BYTE            port1Attributes; // See tPortAttributes
        WORD            port2Base;      // Base port address for IO range 2
        BYTE            port2Size;      // Number of contiguous ports in range 2
        BYTE            port2Attributes; // See tPortAttributes
        BYTE            IOAddressLines; // Number of IO address lines decoded
} tIOArg, FAR *tlpIOArg;

typedef enum tPortAttributes
{
        paSharable        = 0x01,       // Set if port can be shared
        paFirstShared     = 0x02,       // Set to be first client on shared port
        paForceAliasAccess= 0x04,       // Set to check aliased addresses also
        pa16BitIO         = 0x08        // Set if port supports 16 bit access
} tPortAttributes;
```

ReleaseIRQ (1CH)

extern int FAR CSReleaseIRQ (CLIENTHANDLE clientHandle, tIRQArg FAR *pArgs);

```
typedef struct tIRQArg
{
        WORD            socket;         // Logical socket number
```

```
        WORD        attributes;         // See tIRQAttributes
        BYTE        assignedIRQ;        // IRQ assigned to Card. See tIRQEnum
        BYTE        IRQInfo1;           // First PCMCIA IRQ byte, See tIRQInfo
        WORD        IRQInfo2;           // Optional PCMCIA IRQ bytes, See tIRQMask
 5  } tIRQArg, FAR *tlpIRQArg;

typedef enum tIRQAttributes
    {
        qaExclusive           = 0x0000,   // Set for exclusive use of IRQ
10      qaTimeMultiplexedSharing= 0x0001, // Set for time multiplexed IRQ
        qaDynamicSharing      = 0x0002,   // Set for dynamically shared IRQ
        qaSharedIRQ           = 0x0003,   // Use as a mask to check share bits
        qaForcePulse          = 0x0004,   // Set to force pulse mode interrupt
        qaFirstShared         = 0x0008,   // Set to be first client on shared IRQ
15      qaPulseIRQAllocated   = 0x0100    // Set on return if pulse mode interrupt
    } tIRQAttributes;

typedef enum tIRQEnum
    {
20      IRQ0          = 0x0000,    // Enumerations for IRQ 0 thru IRQ 15
        IRQ1          = 0x0001,
        IRQ2          = 0x0002,
        IRQ3          = 0x0003,
        IRQ4          = 0x0004,
25      IRQ5          = 0x0005,
        IRQ6          = 0x0006,
        IRQ7          = 0x0007,
        IRQ8          = 0x0008,
        IRQ9          = 0x0009,
30      IRQ10         = 0x000A,
        IRQ11         = 0x000B,
        IRQ12         = 0x000C,
        IRQ13         = 0x000D,
        IRQ14         = 0x000E,
35      IRQ15         = 0x000F,
        NMI           = 0x0010,    // Non maskable interrupt
        IOCheck       = 0x0011,    // IO error interrupt
        BusError      = 0x0012,    // System bus error interrupt
        VendorSpecific= 0x0013,    // Vendor specific interrupt
40      InvalidIRQ    = 0x0014     // Invalid interrupt number >=
    } tIRQEnum;

typedef enum tIRQInfo
    {
45      qiIRQMask     = 0x0F,      // Use qiIRQMask to get IRQ number
        qiIRQMaskValid= 0x10,      // if qiIRQMaskValid != 0
        qiLevel       = 0x20,      // Set if IRQ is level sensitive
        qiPulse       = 0x40,      // Set if IRQ is pulse mode
        qiShare       = 0x80,      // Set if IRQ is shared
50  } tIRQInfo;

typedef enum tIRQMask
    {
        qmIRQ0        = 0x0001,    // Bit masks for IRQ 0 thru IRQ 15
55      qmIRQ1        = 0x0002,
        qmIRQ2        = 0x0004,
        qmIRQ3        = 0x0008,
        qmIRQ4        = 0x0010,
```

```
        qmIRQ5            = 0x0020,
        qmIRQ6            = 0x0040,
        qmIRQ7            = 0x0080,
        qmIRQ8            = 0x0100,
        qmIRQ9            = 0x0200,
        qmIRQ10           = 0x0400,
        qmIRQ11           = 0x0800,
        qmIRQ12           = 0x1000,
        qmIRQ13           = 0x2000,
        qmIRQ14           = 0x4000
//      qmIRQ15           = 0x08000
//      qmNMI             = 0x10000    // Non maskable interrupt
//      qmIOCheck         = 0x20000    // IO error interrupt
//      qmBusError        = 0x40000    // System bus error interrupt
//      qmVendorSpecific  = 0x80000    // Vendor specific interrupt
} tIRQMask;
```

ReleaseSocketMask (2FH)

extern int FAR CSReleaseSocketMask (CLIENTHANDLE clientHandle, WORD FAR *socket);

ReleaseWindow (1DH)

extern int FAR CSReleaseWindow (WINDOWHANDLE winHandle);

ReplaceSocketServices (33H)

extern int FAR CSReplaceSocketServices (SSFUNC ssEntry, tReplaceSSArg FAR *pArgs);

```
typedef struct tReplaceSSArg
{
    WORD            socket;       // First logical socket to replace
    WORD            numSockets;   // Number of sockets to replace
    WORD            attributes;   // See tBindingAttribute
    tDataPointer    dataPointer;  // Pointer for SS data area (binding
specific)
} tReplaceSSArg, FAR *tlpReplaceSSArg;

typedef enum tBindingAttribute
{
    baRealMode  = 0x0000,   // Real mode address
    ba1616      = 0x0001,   // Protected mode 16:16 address
    ba1632      = 0x0002,   // Protected mode 16:32 address,
    baFlat      = 0x0004    // Protected mode 32 bit address
} tBindingAttribute;

typedef struct tDataPointer
{
    WORD   data[4];                 // Client specific binding information
} tDataPointer;
```

RequestConfiguration (30H)

extern int FAR CSRequestConfiguration (CLIENTHANDLE clientHandle, tRequestConfigArg FAR *pArgs);

```
typedef struct tRequestConfigArg
{
        WORD            socket;         // Logical socket number
        WORD            attributes;     // See tConfigAttributes
        BYTE            vcc;            // Vcc setting
        BYTE            vpp1;           // Vpp1 setting
        BYTE            vpp2;           // Vpp2 setting
        BYTE            interfaceType;  // See tInterfaceType
        DWORD           configBase;     // Card base address of config registers
        BYTE            status;         // Card Status reg setting if present
        BYTE            pin;            // Card Pin register setting (if present)
        BYTE            copy;           // Card Copy register setting (if present)
        BYTE            option;         // Card Option reg setting (if present)
        BYTE            presentRegs;    // Configured card regs, tCardRegisters
} tRequestConfigArg, FAR *tlpRequestConfigArg;

typedef enum tConfigAttributes
{
        caExclusiveUse    = 0x0001,     // Set if RequestExclusive granted
        caValidClient     = 0x0002,     // Set if RequestIRQ/IO/Config granted
        caEnableIRQSteering= 0x0002,    // Set to enable IRQ steering
        caIRQChangeValid  = 0x0004,     // Set if IRQ steering to be changed
        caVccChangeValid  = 0x0008,     // Set if Vcc to be changed
        caVpp1ChangeValid = 0x0010,     // Set if Vpp1 to be changed
        caVpp2ChangeValid = 0x0020      // Set if Vpp2 to be changed
} tConfigAttributes;

typedef enum tCardRegisters
{
        crOption        = 0x01,         // Set if option register valid
        crStatus        = 0x02,         // Set if status register valid
        crPin           = 0x04,         // Set if pin register valid
        crCopy          = 0x08          // Set if copy register valid
} tCardRegisters;

typedef enum tInterfaceType
{
        itMemory        = 0x01,         // Set if memory only interface
        itMemoryAndIO   = 0x02          // Set if memory and IO interface
} tInterfaceType;
```

RequestExclusive (2CH)

extern int FAR CSRequestExclusive (CLIENTHANDLE clientHandle, tClientArg FAR *pArgs);

```
typedef struct tClientArg
{
        WORD            socket;         // Logical socket number
        WORD            attributes;     // See tSocketAttributes
} tClientArg, FAR *tlpClientArg;
```

DHJ                                      45                                      42390.P1513

RequestIO (1FH)

```
extern int FAR CSRequestIO (CLIENTHANDLE clientHandle, tIOArg FAR *pArgs);

typedef struct tIOArg
{
    WORD    socket;             // Logical socket number
    WORD    port1Base;          // Base port address for IO range 1
    BYTE    port1Size;          // Number of contiguous ports in range 1
    BYTE    port1Attributes;    // See tPortAttributes
    WORD    port2Base;          // Base port address for IO range 2
    BYTE    port2Size;          // Number of contiguous ports in range 2
    BYTE    port2Attributes;    // See tPortAttributes
    BYTE    IOAddressLines;     // Number of IO address lines decoded
} tIOArg, FAR *tlpIOArg;

typedef enum tPortAttributes
{
    paSharable         = 0x01,  // Set if port can be shared
    paFirstShared      = 0x02,  // Set to be first client on shared port
    paForceAliasAccess = 0x04,  // Set to check aliased addresses also
    pa16BitIO          = 0x08   // Set if port supports 16 bit access
} tPortAttributes;
```

RequestIRQ (20H)

```
extern int FAR CSRequestIRQ (CLIENTHANDLE clientHandle, tIRQArg FAR *pArgs);

typedef struct tIRQArg
{
    WORD    socket;         // Logical socket number
    WORD    attributes;     // See tIRQAttributes
    BYTE    assignedIRQ;    // IRQ assigned to Card, See tIRQEnum
    BYTE    IRQInfo1;       // First PCMCIA IRQ byte, See tIRQInfo
    WORD    IRQInfo2;       // Optional PCMCIA IRQ bytes, See tIRQMask
} tIRQArg, FAR *tlpIRQArg;

typedef enum tIRQAttributes
{
    qaExclusive             = 0x0000,   // Set for exclusive use of IRQ
    qaTimeMultiplexedSharing= 0x0001,   // Set for time multiplexed IRQ
    qaDynamicSharing        = 0x0002,   // Set for dynamically shared IRQ
    qaSharedIRQ             = 0x0003,   // Use as a mask to check share bits
    qaForcePulse            = 0x0004,   // Set to force pulse mode interrupt
    qaFirstShared           = 0x0008,   // Set to be first client on shared IRQ
    qaPulseIRQAllocated     = 0x0100    // Set on return if pulse mde interrpt
} tIRQAttributes;

typedef enum tIRQEnum
{
    IRQ0    = 0x0000,   // Enumerations for IRQ 0 thru IRQ 15
    IRQ1    = 0x0001,
    IRQ2    = 0x0002,
```

```
            IRQ3             = 0x0003,
            IRQ4             = 0x0004,
            IRQ5             = 0x0005,
            IRQ6             = 0x0006,
            IRQ7             = 0x0007,
            IRQ8             = 0x0008,
            IRQ9             = 0x0009,
            IRQ10            = 0x000A,
            IRQ11            = 0x000B,
            IRQ12            = 0x000C,
            IRQ13            = 0x000D,
            IRQ14            = 0x000E,
            IRQ15            = 0x000F,
            NMI              = 0x0010,    // Non maskable interrupt
            IOCheck          = 0x0011,    // IO error interrupt
            BusError         = 0x0012,    // System bus error interrupt
            VendorSpecific   = 0x0013,    // Vendor specific interrupt
            InvalidIRQ       = 0x0014     // Invalid interrupt number >=
    } tIRQEnum;

typedef enum tIRQInfo
    {
            qiIRQMask        = 0x0F,      // Use qiIRQMask to get IRQ number
            qiIRQMaskValid   = 0x10,      // if qiIRQMaskValid != 0
            qiLevel          = 0x20,      // Set if IRQ is level sensitive
            qiPulse          = 0x40,      // Set if IRQ is pulse mode
            qiShare          = 0x80       // Set if IRQ is shared
    } tIRQInfo;

typedef enum tIRQMask
    {
            qmIRQ0           = 0x0001,    // Bit masks for IRQ 0 thru IRQ 15
            qmIRQ1           = 0x0002,
            qmIRQ2           = 0x0004,
            qmIRQ3           = 0x0008,
            qmIRQ4           = 0x0010,
            qmIRQ5           = 0x0020,
            qmIRQ6           = 0x0040,
            qmIRQ7           = 0x0080,
            qmIRQ8           = 0x0100,
            qmIRQ9           = 0x0200,
            qmIRQ10          = 0x0400,
            qmIRQ11          = 0x0800,
            qmIRQ12          = 0x1000,
            qmIRQ13          = 0x2000,
            qmIRQ14          = 0x4000
//          qmIRQ15          = 0x08000
//          qmNMI            = 0x10000    // Non maskable interrupt
//          qmIOCheck        = 0x20000    // IO error interrupt
//          qmBusError       = 0x40000    // System bus error interrupt
//          qmVendorSpecific = 0x80000    // Vendor specific interrupt
    } tIRQMask;
```

RequestSocketMask (22H)

```
extern int FAR CSRequestSocketMask (CLIENTHANDLE clientHandle,
                                    tRequestSocketMaskArg FAR *pArgs);

typedef struct tRequestSocketMaskArg
{
    WORD            socket;         // Logical socket number
    WORD            eventMask;      // Current event mask, See tEventMask
} tRequestSocketMaskArg, FAR *tlpRequestSocketMaskArg;

typedef enum tEventMask
{
    emWriteProtectChange=0x0001,    // Set to be told of wrte protect chngs
    emCardLockChange    = 0x0002,   // Set to be notified of card lock changes
    emEjectionRequest   = 0x0004,   // Set to be notified of ejection requests
    emInsertionRequest  = 0x0008,   // Set to be notified of insertion reqs
    emBatteryDead       = 0x0010,   // Set to be notified of battry dead evnts
    emBatteryLow        = 0x0020,   // Set to be notified of battery low evnts
    emReadyChange       = 0x0040,   // Set to be notified of card ready chnges
    emCardDetectChange  = 0x0080,   // Set to be notified of card detect chngs
    emPowerManagementChange = 0x0100, // Set to be told power mngmnt chnges
    emReset             = 0x0200,   // Set to be notified of card reset events
    emSSUpdate          = 0x0400    // Set to be notified of SS update calls
} tEventMask;
```

RequestWindow (21H)

```
extern int FAR CSRequestWindow (WINDOWHANDLE FAR *pWinHandle,
                                tRequestWindowArg FAR *pArgs);

typedef struct tRequestWindowArg
{
    WORD            socket;         // Logical socket number
    WORD            attributes;     // See tWindowAttributes
    DWORD           base;           // System base address for window
    DWORD           size;           // Size of window in bytes
    BYTE            accessSpeed;    // Window speed, See tAccessSpeed
} tRequestWindowArg, FAR *tlpRequestWindowArg;

typedef enum tWindowAttributes
{
    waCommon        = 0x0000,   // Clear if window is in common memory
    waIOWindow      = 0x0001,   // Set if window is for IO
    waAttribute     = 0x0002,   // Set if window is in attribute memory
    waEnabled       = 0x0004,   // Set if window is to be enabled
    waSpeedValid    = 0x0008,   // Set if accessSpeed valid fr ModifyWindow
    wa16BitAccess   = 0x0008,   // Set if memory supports 16 bit access
    waPaged         = 0x0010,   // Set if window must be a multiple of 4K
    waShared        = 0x0020,   // Set if memory area can be shared
    waFirstShared   = 0x0040,   // Set to be first client on shared memory
    waOffsetIsWindowSize = 0x0100  // Set if offsets from RequestWindow
                                   // window as
} tWindowAttributes;

typedef enum tAccessSpeed
```

```
{
    as250ns         = 0x01,     // If speedMantissa == 0 the device
    as200ns         = 0x02,     // access speed is given by one of
    as150ns         = 0x03,     // these default values; otherwise,
    as100ns         = 0x04,     // these bits form the exponent part.
    asSpeedExponent = 0x07,     // Use as a mask if speedMantissa != 0
    asSpeedMantissa = 0x78,     // Use as a mask for mantissa part.
    asUseWaitState  = 0x80      // Set to use wait state (if available)
} tAccessSpeed;
```

ResetCard (11H)

```
extern int FAR CSResetCard (CLIENTHANDLE clientHandle, tClientArg FAR *pArgs);

typedef struct tClientArg
{
    WORD        socket;     // Logical socket number
    WORD        attributes; // See tSocketAttributes
} tClientArg, FAR *tlpClientArg;
```

ReturnSSEntry (23H)

```
extern int FAR CSReturnSSEntry (SSFUNC FAR *ssEntry, WORD FAR *attributes);

WORD        attributes; // Binding info for ssEntry, See
tBindingAttribute typedef enum tBindingAttribute
{
    baRealMode  = 0x0000,   // Real mode address
    ba1616      = 0x0001,   // Protected mode 16:16 address
    ba1632      = 0x0002,   // Protected mode 16:32 address,
    baFlat      = 0x0004    // Protected mode 32 bit address
} tBindingAttribute;
```

SetEventMask (31H)

```
extern int FAR CSSetEventMask (CLIENTHANDLE clientHandle, tEventMaskArg FAR *pArgs);

typedef struct tEventMaskArg
{
    WORD        attributes; // See tSocketAttributes
    WORD        eventMask;  // Current/new event mask, See tEventMask
    WORD        socket;     // Logical socket number
} tEventMaskArg, FAR *tlpEventMaskArg;

typedef enum tSocketAttributes
{
    saGlobalMask  = 0x0000, // Clear to access global event mask
    saSocketMask  = 0x0001, // Set to access socket event mask saAllClients  = 0x0000, // Clear to access all clients
```

```
        saSocketClients   = 0x0001     // Set to access clients on socket
    } tSocketAttributes;

typedef enum tEventMask
5   {
        emWriteProtectChange= 0x0001,   // Set to be told of wrte protect chngs
        emCardLockChange   = 0x0002,    // Set to be notified of card lock changes
        emEjectionRequest  = 0x0004,    // Set to be notified of ejection requests
        emInsertionRequest = 0x0008,    // Set to be notified of insertion reqs
10      emBatteryDead      = 0x0010,    // Set to be notified of battry dead evnts
        emBatteryLow       = 0x0020,    // Set to be notified of battery low evnts
        emReadyChange      = 0x0040,    // Set to be notified of card ready chnges
        emCardDetectChange = 0x0080,    // Set to be notified of card detect chngs
        emPowerManagementChange=0x0100, // Set to be told power mangmnt changes
15      emReset            = 0x0200,    // Set to be notified of card reset events
        emSSUpdate         = 0x0400     // Set to be notified of SS update calls
    } tEventMask;

20  SetRegion (29H)

extern int FAR CSSetRegion (MTDHANDLE MTDHandle, tSetRegionArg FAR *pArgs);

25  typedef struct tSetRegionArg
    {
        WORD    socket;             // Logical socket number
        WORD    attributes;         // See tRegionAttributes
        DWORD   cardOffset;         // Card offset to memory region
30      DWORD   regionSize;         // Size of region in bytes
        DWORD   eraseBlockSize;     // Erase block size in bytes
        WORD    paritionMultiple;   // Minimum partition size in blocks
        WORD    JEDECID;            // JEDEC identifier of memory region
        DWORD   biasOffset;         // Address bias for MTD
35      BYTE    accessSpeed;        // Window speed, See tAccessSpeed
    } tSetRegionArg, FAR *tlpSetRegionArg;

typedef enum tRegionAttributes
    {
40      raCommon              = 0x0000,  // Clear if common memory region
        raAttribute           = 0x0001,  // Set if attribute memory region
        raDeleteRegion        = 0x0002,  // See tSetRegionArg
        raVirtualRegion       = 0x0100,  // Set if virtual region
        raWriteWithoutErase   = 0x0000,  // Clear if write without erase
45      raWriteWithErase      = 0x0200,  // Set if erase before writes
        raWriteDisableableErase=0x0600,  // Set if eras can be disabled b4 writs
        raWriteWithVerify     = 0x0800,  // Set if verify after writes
        raEraseSupported      = 0x1000   // Set if erase requests supported
    } tRegionAttributes;
50
    typedef enum tAccessSpeed
    {
        as250ns          = 0x01,   // If speedMantissa == 0 the device
        as200ns          = 0x02,   // access speed is given by one of
55      as150ns          = 0x03,   // these default values; otherwise,
        as100ns          = 0x04,   // these bits form the exponent part.
        asSpeedExponent  = 0x07,   // Use as a mask if speedMantissa != 0
        asSpeedMantissa  = 0x78,   // Use as a mask for mantissa part.
```

```
        asUseWaitState   = 0x80      // Set to use wait state (if available)
} tAccessSpeed;
```

ValidateCIS (2BH)

```
extern int FAR CSValidateCIS (tValidateCISArg FAR *pArgs);

typedef struct tValidateCISArg
{
        WORD     socket;         // Logical socket number
        WORD     numChains;      // Number of tuple chains on card
} tValidateCISArg, FAR *tlpValidateCISArg;
```

VendorSpecific (34H)

```
extern int FAR CSVendorSpecific (tVendorSpecificArg FAR *pArgs);

typedef struct tVendorSpecificArg
{
        WORD     infoLen;          // Number of bytes needed for vendorInfo
//      BYTE     vendorInfo[N];    // IMPLEMENTATION SPECIFIC
} tVendorSpecificArg, FAR *tlpVendorSpecificArg;
```

WriteMemory (24H)

```
extern int FAR CSWriteMemory (MEMORYHANDLE memHandle, BYTE FAR *buffer,
                              tWriteMemArg FAR *pArgs);

typedef struct tWriteMemArg
{
        DWORD    offset;         // Card offset of memory to write
        DWORD    count;          // Number of bytes to write
        WORD     attributes;     // See tMemoryAttributes
} tWriteMemArg, FAR *tlpWriteMemArg;

typedef enum tMemoryAttributes
{
        maCommon       = 0x0000,    // Clear for common memory type
        maAttribute    = 0x0001,    // Set for attribute memory type
        maExclusive    = 0x0002,    // Set for exclusive use
        maDisableErase = 0x0004,    // Set to disable memory erase
        maVerify       = 0x0008,    // Set to verify after write
        maShared       = 0x0020     // Set to allow shared access
} tMemoryAttributes;
```

The foregoing has described a C language function library for accessing PCMCIA Card Services on a personal computer. It is contemplated that changes and modifications may be made by one of ordinary skill in the art, to the materials and arrangements of elements of the present invention without departing from the scope of the invention.

We claim:

1. A method for implementing PCMCIA Card Services for at least one application program running on a computer system executing a Windows operating system, said method comprising the steps of:

loading a Card Services driver into said computer system, said Card Services driver being software interrupt based;

providing a translation Card Services dynamic link library, said translation Card Services dynamic link library comprising a library of translation C functions corresponding to a library of defined Card Services functions;

calling a translation C function in said translation Card Services dynamic link library from said application program to perform a corresponding Card Services function, said application program passing at least one function parameter to said translation C function;

placing said function parameter passed to said translation C function into a register for a Card Services software interrupt call into said Card Services driver; and calling said Card Services driver from said translation C function in said translation Card Services dynamic link library using a software interrupt call, said Card Services driver performing said Card Services functionality.

2. The method as claimed in claim 1, wherein said method further comprises the step of:

translating said function parameters from a protected mode into a real mode such that said Card Services provider receives real mode parameters.

3. The method as claimed in claim 2, wherein said method further comprises the step of:

moving said real mode function parameters from a first memory region in said computer system above a one megabyte address boundary to a second memory region in said computer system below said one megabyte address boundary.

4. The method as claimed in claim 3, wherein said method further comprises the steps of:

creating a Card Services virtual device driver;

hooking a Card Services software interrupt such that said Card Services virtual device driver executes when a Card Services client generates said Card Services software interrupt; and calling said Card Services provider from said Card Services virtual device driver to perform Card Services functions.

5. The method as claimed in claim 4, wherein said method further comprises the steps of:

calling a callback routine in said Card Services client from said Card Services virtual device driver if a corresponding defined Card Services function requires a callback to be performed into said Card Services client.

6. The method as claimed in claim 5, further comprising the steps of:

registering a Card Services client with said Card Services provider, said Card Services client providing a ClientData field and an original client callback address to said Card Services provider during said step of registering;

storing said ClientData field in said Card Services virtual device driver;

replacing said ClientData field in said Card Services provider with a value that uniquely identifies said Card Services client;

storing said original client callback address in said Card Services virtual device driver;

replacing said original client callback address in said Card Services provider with a VxD callback address located within said Card Services virtual device driver;

receiving a callback to said VxD callback address in said Card Services virtual device driver from said Card Services provider, said Card Services virtual device driver identifying a Card Services client using said value that uniquely identifies said Card Services client; and calling said callback routine in said Card Services client from said Card Services virtual device driver using said original client callback address provided by said Card Services client and providing said original ClientData field as a ClientData field.

7. The method as claimed in claim 6, wherein said Card Services virtual device driver also handles Card Services requests from at least one Card Services client in a DOS virtual machine running under said Windows operating system.

8. The method as claimed in claim 7, wherein said Card Services virtual device driver also handles callbacks into said Card Services client in said DOS virtual machine running under said Windows operating system.

9. The method as claimed in claim 8, wherein said Card Services provider comprises a Terminate and Stay Resident (TSR) DOS program.

10. A method for implementing PCMCIA Card Services for at least one application program running on a computer system executing a Windows operating system, said method comprising the steps of:

creating a Card Services dynamic link library, said Card Services dynamic link library comprising a library of C functions corresponding a library of defined Card Services functions;

executing a Card Services Windows application program on said computer system, said Card Services Windows application for performing background processing;

calling a C function in said Card Services dynamic link library from said application program, said application program providing at least one function parameter when calling said C function, said C function performing said corresponding defined Card Services function; and posting a message to said Card Services Windows application from said Card Services dynamic link library if said C function requires background processing.

11. The method as claimed in claim 10, wherein said Card Services Windows application performs background processing by calling a C function located within the Card Services dynamic link library.

12. The method as claimed in claim 11, wherein said method further comprises the step of:

storing a Card Services database within said Card Services dynamic link library, said Card Services database containing a list of available Card Services resources, said Card Services data base is updated by said C functions.

13. The method as claimed in claim 12, wherein said method further comprises the step of:

executing a callback routine in a Windows application from said Card Services dynamic link library if a corresponding defined Card Services function requires a callback into said Windows application to be performed.

14. The method as claimed in claim 13, wherein said method further comprises the step of:

implementing a Card Services virtual device driver;

executing operating system functions from said Card Services virtual device driver on behalf of said Card Services dynamic link library.

15. The method as claimed in claim 14, wherein said method further comprises the steps of:

hooking a Card Services software interrupt such that said Card Services virtual device driver executes when a Card Services client generates said Card Services software interrupt; and calling a C function in said Card Services dynamic link library from said Card Services virtual device driver to perform Card Services functions when said Card Services virtual device driver receives a software interrupt.

16. The method as claimed in claim 15, wherein said method further comprises the steps of:

implementing a VxD Card Services interface into said Card Services virtual device driver such that at least one other virtual device driver can access said Card Services virtual device driver;

calling said VxD Card Services interface from said other virtual device driver; and calling a C function in said Card Services dynamic link library from said Card Services virtual device driver to perform Card Services functions when said Card Services virtual device driver receives a call from said other virtual device driver.

17. The method as claimed in claim 15, wherein said Card Services virtual device driver executes a callback routine in said other virtual device driver if a corresponding defined Card Services function requires a callback to be performed.

18. In a computer system running the Windows operating system, an apparatus for providing a C library for PCMCIA Card Services for at least one Windows application running on said Windows operating system, said apparatus comprising the elements of:

translation Card Services library means, said translation Card Services library means comprising a library of translation C functions corresponding a library of defined Card Services functions; and Card Services means, said Card Services means performing the Card Services functions, said translation Card Services library means calling said Card Services means to perform Card Services functions.

* * * * *